US007205156B2

(12) United States Patent
Rich et al.

(10) Patent No.: US 7,205,156 B2
(45) Date of Patent: Apr. 17, 2007

(54) PROBES FOR A GAS PHASE ION SPECTROMETER

(75) Inventors: William E. Rich, Redwood Shores, CA (US); Pil-Je Um, Daly City, CA (US); Kamen Voivodov, Hayward, CA (US); Tai-Tung Yip, Cupertino, CA (US); Jody Beecher, San Jose, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 10/960,222

(22) Filed: Oct. 6, 2004

(65) Prior Publication Data

US 2005/0090016 A1 Apr. 28, 2005

Related U.S. Application Data

(62) Division of application No. 09/560,715, filed on Apr. 27, 2000, now Pat. No. 6,897,072.

(60) Provisional application No. 60/131,652, filed on Apr. 29, 1999.

(51) Int. Cl.
*G01N 24/00* (2006.01)

(52) U.S. Cl. ...................................................... 436/173

(58) Field of Classification Search ..................... None
See application file for complete search history.

(56) References Cited

U.S. PATENT DOCUMENTS

| | | | | |
|---|---|---|---|---|
| 3,896,661 | A | 7/1975 | Parkhurst et al. | |
| 4,070,348 | A | 1/1978 | Kräemer et al. | |
| 4,154,638 | A | 5/1979 | Franz et al. | |
| 4,163,092 | A | 7/1979 | Steckler | |
| 4,367,323 | A | 1/1983 | Kitamura et al. | |
| 4,438,239 | A * | 3/1984 | Rembaum et al. | 525/54.1 |
| 4,446,261 | A | 5/1984 | Yamasaki et al. | |
| 4,452,892 | A | 6/1984 | Rosevear | |
| 4,656,127 | A | 4/1987 | Mundy | |
| 4,721,647 | A | 1/1988 | Nakanishi et al. | |
| 4,908,512 | A * | 3/1990 | Caprioli et al. | 250/288 |
| 5,045,694 | A | 9/1991 | Beavis et al. | |
| 5,118,937 | A | 6/1992 | Hillenkamp et al. | |
| 5,196,302 | A | 3/1993 | Kidwell | |
| 5,242,828 | A | 9/1993 | Bergstrom et al. | |
| 5,268,097 | A | 12/1993 | Girot et al. | |
| 5,316,912 | A | 5/1994 | Heimgartner et al. | |
| 5,393,430 | A | 2/1995 | Girot et al. | |
| 5,403,902 | A | 4/1995 | Heilmann et al. | |
| 5,436,161 | A | 7/1995 | Bergström et al. | |
| 5,478,873 | A | 12/1995 | Sanada et al. | |
| 5,478,893 | A | 12/1995 | Ghosh et al. | |
| 5,492,840 | A | 2/1996 | Malmqvist et al. | |
| 5,512,492 | A | 4/1996 | Herron et al. | |
| 5,532,279 | A | 7/1996 | Barretto et al. | |
| 5,700,637 | A | 12/1997 | Southern | |
| 5,719,060 | A | 2/1998 | Hutchens et al. | |
| 5,744,305 | A | 4/1998 | Fodor et al. | |
| 5,776,706 | A | 7/1998 | Siiman et al. | |
| 5,786,439 | A | 7/1998 | Van Antwerp et al. | |
| 5,807,522 | A | 9/1998 | Brown et al. | |
| 5,847,105 | A | 12/1998 | Baldeschwieler et al. | |
| 5,853,994 | A | 12/1998 | Gopinathan et al. | |

(Continued)

FOREIGN PATENT DOCUMENTS

| | | | |
|---|---|---|---|
| GB | 2156074 | A | 10/1985 |
| GB | 2236185 | A | 3/1991 |
| WO | WO 90/05295 | A1 | 5/1990 |
| WO | WO 90/05305 | A1 | 5/1990 |
| WO | WO 94/28418 | A1 | 12/1994 |
| WO | WO 95/25116 | A1 | 9/1995 |
| WO | WO 95/35505 | A1 | 12/1995 |
| WO | WO 97/09608 | A1 | 3/1997 |
| WO | WO 98/05269 | A1 | 2/1998 |
| WO | WO 98/59361 | A1 | 12/1998 |
| WO | WO 99/36576 | A1 | 7/1999 |
| WO | WO 00/56934 | A1 | 9/2000 |

OTHER PUBLICATIONS

Bearinger, J. P., et al., "Biomolecular modification of p(AAm-co-EG/AA) IPNs supports osteoblast adhesion and phenotypic express," *J. Biomater. Sci. Polymer Edn.*, 9(7):629-652 (1998).

(Continued)

*Primary Examiner*—Sheeba Ahmed
(74) *Attorney, Agent, or Firm*—Townsend and Townsend and Crew LLP

(57) ABSTRACT

The invention provides a probe and a method of making the probe that is removably insertable into a gas phase ion spectrometer, the probe comprising a substrate having a surface and a hydrogel material on the surface, the hydrogel material comprising binding functionalities for binding with an analyte detectable by the gas phase ion spectrometer. The invention also provides a probe and a method of making the probe that is removably insertable into a gas phase ion spectrometer, the probe comprising a substrate having a surface and a plurality of particles that are uniform in diameter on the surface, the particles comprising binding functionalities for binding with an analyte detectable by the gas phase ion spectrometer. Further, the invention provides a system comprising the probe of the present invention and a gas phase ion spectrometer comprising an energy source that directs light to the probe surface to desorb an analyte and a detector in communication with the probe surface that detects the desorbed analyte. The invention also provides a method for desorbing an analyte from a probe surface, the method comprising exposing the binding functionalities to a sample containing an analyte under conditions to allow binding between the analyte and the binding functionalities, and desorbing the analyte from the probe by gas phase ion spectrometry.

31 Claims, 4 Drawing Sheets

U.S. PATENT DOCUMENTS

| | | | |
|---|---|---|---|
| 5,871,928 | A | 2/1999 | Fodor et al. |
| 5,955,729 | A | 9/1999 | Nelson et al. |
| 6,110,426 | A | 8/2000 | Shalon et al. |
| 6,143,499 | A | 11/2000 | Mirzabekov et al. |

OTHER PUBLICATIONS

Frank, "Strategies and Techniques in Simultaneous Solid Phase Synthesis Based on the Segmentation of Membrane Type Supports," *Bioorganic and Medicinal Chemistry Letters*, 3(3): 425-430 (1993).

Johnsson et al. "Comparison of methods for immobilization to carboxymethyl dextran sensor surfaces by analysis of the specific activity of monoclonal antibodies," *J. Mol. Recognit*. Jan.-Apr. 1995;8(1-2):125-131.

Johnsson et al. "Immobilization of proteins to a carboxymethyldextran-modified gold surface for biospecific interaction analysis in surface plasmon resonance sensors," *Anal. Biochem*. Nov. 1, 1991; 198(2): 268-277.

Jonsson et al. "Real-time biospecific interaction analysis using surface plasmon resonance and a sensor chip technology," *Biotechniques*. Nov. 1991; 11(5): 620-627.

Khrapko et al., "A method for DNA sequencing by hybridization with oligonucleotide matrix," *DNA Sequence—J. DNA Sequencing and Mapping* 1: 375-388 (1991).

Lofas and Johnsson, "A Novel Hydrogel Matrix on Gold Surfaces in Surface Plasmon Resonance Sensors for Fast and Efficient Covalent Immobilization of Ligands," *J. Chem. Soc. Chem. Commun*. (1990) 1526-1528.

Merrill et al. (1996) Hydrogels in Medicine and Pharmacy, vol. III, Ed. Peppas NA, Chapter 1, CRC Press.

Microsphere Selection Guide, Dec. 1998, Bangs Laboratories, Inc., Fishers, IN, pp. 1-8.

Sensor Chip CMS; website http://www/biacore.com/products/sc_cm5.html.

* cited by examiner

Selective Binding of Proteins in Fetal Calf Serum to ProteinChip™ II SAX-2 at Different pH Values Selective Binding of Proteins in Fetal Calf Serum to ProteinChip™ II IMAC-3

PROBES FOR A GAS PHASE ION SPECTROMETER

CROSS-REFERENCES TO RELATED APPLICATIONS

This application claims priority to provisional application U.S. Ser. No. 60/131,652, filed Apr. 29, 1999, the disclosure of which is herein incorporated by reference in its entirety.

STATEMENT AS TO RIGHTS TO INVENTIONS MADE UNDER FEDERALLY SPONSORED RESEARCH AND DEVELOPMENT

Not Applicable.

BACKGROUND OF THE INVENTION

This invention relates to the field of separation science and analytical biochemistry using gas phase ion spectrometry, in particular mass spectrometry. Typically, analysis of biological samples by mass spectrometry involves the desorption and ionization of a small sample of material using an ionization source, such as a laser. The material is desorbed into a gas or vapor phase by the ionization source, and in the process, some of the individual molecules are ionized. Then the ionized molecules can be dispersed by a mass analyzer and detected by a detector. For example, in a time-of-flight mass analyzer, the positively charged ionized molecules are accelerated through a short high voltage field and let fly (drift) into a high vacuum chamber, at the far end of which they strike a sensitive detector surface. Since the time-of-flight is a function of the mass of the ionized molecule, the elapsed time between ionization and impact can be used to identify the presence or absence of molecules of specific mass.

Desorption mass spectrometry had been around for some time. However, it was difficult to determine molecular weights of large intact biopolymers, such as proteins and nucleic acids, because they were fragmented (destroyed) upon desorption. This problem was overcome by using a chemical matrix. In matrix-assisted laser desorption/ionization (MALDI), the analyte solution is mixed with a matrix solution (e.g., a very large molar excess of an acidic, UV absorbing matrix solution). The mixture is allowed to crystallize after being deposited on an inert probe surface, trapping the analyte within the crystals. The matrix is selected to absorb the laser energy and apparently impart it to the analyte, resulting in desorption and ionization. See, U.S. Pat. No. 5,118,937 (Hillenkamp et al.), and U.S. Pat. No. 5,045,694 (Beavis & Chait).

Recently, surface-enhanced laser desorption/ionization (SELDI) was developed which is a significant advance over MALDI. In SELDI, the probe surface is an active participant in the desorption process. One version of SELDI uses a probe with a surface chemistry that selectively captures analytes of interest. For example, the probe surface chemistry can comprise binding functionalities based on oxygen-dependent, carbon-dependent, sulfur-dependent, and/or nitrogen-dependent means of covalent or noncovalent immobilization of analytes. The surface chemistry of a probe allows the bound analytes to be retained and unbound materials to be washed away. Subsequently, analytes bound to the probe surface can be desorbed and analyzed using mass spectrometry. This method allows samples to be desorbed and analyzed directly without any intermediate steps of sample preparation, such as sample labeling or purification. Therefore, SELDI provides a single, integrated operating system for the direct detection of analytes. SELDI and its modified versions are described in U.S. Pat. No. 5,719,060 (Hutchens & Yip) and WO98/59361 (Hutchens & Yip).

The desorption methods described above have unlimited applications in the field of separation science and analytical biochemistry. For example, cell surface or soluble receptors can be attached to the probe surface to screen for ligands. Bound ligands can then be analyzed by desorption and ionization. Nucleic acid molecules can also be attached to the probe surface to capture biomolecules from complex solutions. Biomolecules, which are bound to the nucleic acid, can then be isolated and analyzed by desorption and ionization. Furthermore, antibodies attached to the probe surface can be used to capture and identify specific antigens. The antigens which are specifically bound to the antibody can then be isolated and analyzed by desorption and ionization.

While the probes described above provide a great tool in the field of separation science and analytical biochemistry, it would be desirable to develop a probe having a surface chemistry that provides an increased capacity and sensitivity. When the amount of sample available for analysis is very small and limited, it would be desirable to have a desorption system having an increased sensitivity of detection. Furthermore, it would be also desirable to develop a probe capable of providing consistent mass resolution and intensities of bound analytes on the probe.

SUMMARY OF THE INVENTION

This invention provides, for the first time, probes for a gas phase ion spectrometer comprising a hydrogel material having binding functionalities that bind analytes detectable by the gas phase ion spectrometer. The hydrogel material is a water-insoluble and water-swellable polymer that is crosslinked and is capable of absorbing at least 10 times, preferably at least 100 times, its own weight of a liquid. By swelling upon infusion of a liquid solution comprising analytes, hydrogel materials provide a three dimensional scaffolding from which the binding functionalities are presented. This results in a probe surface with a significantly higher capacity for analytes which may lead to an increased sensitivity of detection. The hydrophilic nature of the hydrogel material also reduces non-specific binding of biomolecules, such as proteins. Furthermore, the porous nature of the hydrogel material allows unbound sample components to be readily washed out during a wash step.

The invention also provides, for the first time, probes for a gas phase ion spectrometer comprising uniform particles having binding functionalities that bind analytes detectable by the gas phase ion spectrometer. The size or diameter of the particles are uniform, thereby providing uniform placement of the particles onto the substrate surface. Such a probe provides consistent mass resolution and intensities of analytes desorbed from the probe.

In one aspect, the invention provides a probe that is removably insertable into a gas phase ion spectrometer, the probe comprising a substrate having a surface and a hydrogel material on the surface, wherein the hydrogel material is crosslinked and comprises binding functionalities for binding with an analyte detectable by the gas phase ion spectrometer.

In one embodiment, the substrate is in the form of a strip or a plate.

In another embodiment, the substrate is electrically conducting.

In another embodiment, the substrate is conditioned to adhere the hydrogel material.

In another embodiment, the surface of the substrate is conditioned with a metal coating, an oxide coating, a sol gel, a glass coating, or a coupling agent.

In another embodiment, the surface of the substrate is rough, porous or microporous.

In another embodiment, the hydrogel material is in situ polymerized on the surface of the substrate.

In another embodiment, the hydrogel material is in situ polymerized on the surface of the substrate using pre-functionalized monomers.

In another embodiment, the probe surface is coated with a glass coating, and the hydrogel material is in situ polymerized on the glass coating by depositing a solution comprising monomers onto the glass coating, wherein the monomers are pre-functionalized to provide binding functionalities.

In another embodiment, the thickness of the coating and the hydrogel material combined is at least about 1 micrometer.

In another embodiment, the thickness of the hydrogel material is at least about 1 micrometer.

In another embodiment, the hydrogel material is in the form of a discontinuous pattern.

In another embodiment, the hydrogel material is in the form of discontinuous, discrete spots.

In another embodiment, the hydrogel material is continuous and has one or two-dimensional gradient of one or more of the binding functionalities.

In another embodiment, a plurality of different hydrogel materials comprising different binding functionalities are on the surface of the substrate.

In another embodiment, the hydrogel material is a homopolymer, a copolymer, or a blended polymer.

In another embodiment, the hydrogel material is derived from substituted acrylamide monomers, substituted acrylate monomers, or derivatives thereof.

In another embodiment, the binding functionalities attract the analyte by salt-promoted interactions, hydrophilic interactions, eletrostatic interactions, coordinate interactions, covalent interactions, enzyme site interactions, reversible covalent interactions, nonreversible covalent interactions, glycoprotein interactions, biospecific interactions, or combinations thereof.

In another embodiment, the binding functionalities of the hydrogel material are selected from the group consisting of a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, and derivatives thereof.

In another embodiment, the binding functionalities are a carboxyl group and the hydrogel material is derived from monomers selected from the group consisting of (meth) acrylic acid, 2-carboxyethyl acrylate, N-acryloyl-aminohexanoic acid, N-carboxymethylacrylamide, 2-acrylamidoglycolic acid, and derivatives thereof.

In another embodiment, the binding functionalities are a sulfonate group and the hydrogel material is derived from acrylamidomethyl-propane sulfonic acid monomers or derivatives thereof.

In another embodiment, the binding functionalities are a phosphate group and the hydrogel material is derived from N-phosphoethyl acrylamide monomers or derivatives thereof.

In another embodiment, the binding functionalities are an ammonium group and the hydrogel material is derived from monomers selected from the group consisting of trimethylaminoethyl methacrylate, diethylaminoethyl methacrylate, diethylaminoethyl acrylamide, diethylaminoethyl methacrylamide, diethylaminopropyl methacrylamide, aminopropyl acrylamide, 3-(methacryloylamino)propyltrimethylammonium chloride, 2-aminoethyl methacrylate, N-(3-aminopropyl)methacrylamide, 2-(t-butylamino)ethyl methacrylate, 2-(N, N-dimethylamino)ethyl (meth)acrylate, N-(2-(N, N-dimethylamino))ethyl (meth)acrylamide, N-(3-(N, N-dimethylamino))propyl methacrylamide, 2-(meth)acryloyloxyethyltrimethylammonium chloride, 3-methacryloyloxy-2-hydroxypropyltrimethylammonium chloride, (2-acryloyloxyethyl)(4-benzoylbenzyl)dimethylammonium bromide, 2-vinylpyridine, 4-vinylpyridine, vinylimidazole, and derivatives thereof.

In another embodiment, the binding functionalities are a hydrophilic group and the hydrogel material is derived from monomers selected from the group consisting of N-(meth) acryloyltris(hydroxymethyl)methylamine, hydroxyethyl acrylamide, hydroxypropyl methacrylamide, N-acrylamido-1-deoxysorbitol, hydroxyethyl(meth)acrylate, hydroxypropylacrylate, hydroxyphenylmethacrylate, polyethylene glycol monomethacrylate, polyethylene glycol dimethacrylate, aerylamide, glycerol mono(meth)acrylate, 2-hydroxypropyl acrylate, 4-hydroxybutyl methacrylate, 2-methacryloxyethyl glucoside, poly(ethyleneglycol) monomethyl ether monomethacrylate, vinyl 4-hydroxybutyl ether, and derivatives thereof.

In another embodiment, the binding functionalities are a hydrophobic group and the hydrogel material is derived from monomers selected from the group consisting of N, N-dimethyl acrylamide, N, N-diethyl (meth)acrylamide, N-methyl methacrylamide, N-ethyl methacrylamide, N-propyl acrylamide, N-butyl acrylamide, N-octyl (meth)acrylamide, N-dodecyl methacrylamide, N-octadecyl acrylamide, propyl (meth)acrylate, decyl (meth)acrylate, stearyl (meth) acrylate, octyl-triphenylmethylacrylamide, butyl-triphenylmethylacrylamide, octadedcyl-triphenylmethylacrylamide, phenyl-triphenylmethylacrylamide, benzyl-triphenylmethylacrylamide, and derivatives thereof.

In another embodiment, the binding functionalities are a metal chelating group and the hydrogel material is derived from monomers selected from the group consisting of N-(3-N, N-biscarboxymethylamino)propyl methacrylamide, 5-methacrylamido-2-(N, N-biscarboxymethylamino)pentanoic acid, N-(acrylamidoethyl)ethylenediamine N, N', N'-triacetic acid, and derivatives thereof.

In another embodiment, the binding functionalities are a reactive group and the hydrogel material is derived from monomers selected from the group consisting of glycidyl acrylate, acryloyl chloride, glycidyl(meth)acrylate, (meth) acryloyl chloride, N-acryloxysuccinimide, vinyl azlactone, acrylamidopropyl pyridyl disulfide, N-(acrylamidopropyl) maleimide, acrylamidodeoxy sorbitol activated with bis-epoxirane compounds, allylchloroformate, (meth)acrylic anhydride, acrolein, allylsuccinic anhydride, citraconic anhydride, allyl glycidyl ether, and derivatives thereof.

In another embodiment, the binding functionalities are a thioether group and the hydrogel material is derived from thiophilic monomers selected from the group consisting of 2-hydroxy-3-mercaptopyridylpropyl (methacrylate), 2-(2-(3-(meth)acryloxyethoxy)ethanesulfonyl)ethylsulfanyl ethanol, and derivatives thereof.

In another embodiment, the binding functionalities are a biotin group and the hydrogel material is derived from biotin monomers selected from the group consisting of N-biotinyl-3-(meth)acrylamidopropylamine and derivatives thereof.

In another embodiment, the binding functionalities are a boronate group and the hydrogel material is derived from boronate monomers selected from the group consisting of N-(m-dihydroxyboryl)phenyl (meth)acrylamide and derivatives thereof.

In another embodiment, the binding functionalities are a dye group and the hydrogel material is derived from dye monomers selected from the group consisting of N-(N'-dye coupled aminopropyl) (meth)acrylamide and derivatives thereof.

In another embodiment, the binding functionalities are a cholesterol group and the hydrogel material is derived from cholesterol monomers selected from the group consisting of N-cholesteryl-3-(meth) acrylamidopropylamine and derivatives thereof.

In another aspect, the invention provides a probe that is removably insertable into a gas phase ion spectrometer, the probe comprising a substrate having a surface and a plurality of particles that are substantially uniform in diameter on the surface, the particles comprising binding functionalities for binding with an analyte detectable by the gas phase ion spectrometer.

In one embodiment, the plurality of particles have an average diameter of less than about 1000 μm, optionally between about 0.01 μm to about 1000 μm.

In another embodiment, the particles have a coefficient of diameter variation of less than about 5%.

In another embodiment, the surface of the substrate is conditioned to adhere to the particles.

In another embodiment, the binding functionalities of the particles are selected from the group consisting of a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, and derivatives thereof.

In another aspect, the present invention provides a system for detecting an analyte comprising: a gas phase ion spectrometer comprising an inlet system, and any removably insertable probe described herein inserted into the inlet system.

In one embodiment, the gas phase ion spectrometer is a mass spectrometer.

In another embodiment, the mass spectrometer is a laser desorption mass spectrometer.

In another aspect, the present invention provides a method of making a probe that is removably insertable into a gas phase ion spectrometer, the method comprising: providing a substrate having a surface; conditioning the surface of the substrate; and placing a hydrogel material or a plurality of particles on the surface of the substrate, wherein the hydrogel material or the plurality of particles comprise binding functionalities for binding with an analyte detectable by the gas phase ion spectrometer.

In one embodiment, the surface of the substrate is conditioned by roughening.

In another embodiment, the surface of the substrate is conditioned by laser etching, chemical etching, or sputter etching.

In another embodiment, the surface of the substrate is conditioned by incorporating a metal coating, an oxide coating, a sol gel, a glass coating, or a coupling agent.

In another embodiment, the hydrogel material is produced by polymerizing monomers in situ on the surface of the substrate.

In another embodiment, the hydrogel material is produced by using the monomers that are pre-functionalized to provide binding functionalities.

In another embodiment, the hydrogel material is crosslinked by irradiation.

In another embodiment, the hydrogel material is produced by crosslinking monomers by irradiation in situ on the surface of the substrate.

In another aspect, the invention provides a method for detecting an analyte comprising: (a) providing any probes described herein, (b) exposing the binding functionalities of the hydrogel material or the particles to a sample containing an analyte under conditions to allow binding between the analyte and the binding functionalities; (c) striking the probe surface with energy from an energy source; (d) desorbing the bound analyte from the probe by a gas phase ion spectrometer; and (3) detecting the desorbed analyte.

In one embodiment, the gas phase ion spectrometer is a mass spectrometer.

In another embodiment, the mass spectrometer is a laser desorption mass spectrometer.

In another embodiment, the method further comprises a washing step to selectively modify a threshold of binding between the analyte and the binding functionalities of the hydrogel material or the plurality of particles.

In another embodiment, the method further comprises a step of modifying the analyte chemically or enzymatically while bound to the binding functionalities of the hydrogel material.

In another embodiment, the analyte is selected from the group consisting of amine-containing combinatorial libraries, amino acids, dyes, drugs, toxins, biotin, DNA, RNA, peptides, oligonucleotides, lysine, acetylglucosamine, procion red, glutathione, and adenosinemonophosphate.

In another embodiment, the analyte is selected from the group consisting of polynucleotides, avidin, streptavidin, polysaccharides, lectins, proteins, pepstatin, protein A, agglutinin, heparin, protein G, and concanavalin.

In another embodiment, the analyte comprises a complex of different biopolymers.

DESCRIPTION OF THE SPECIFIC EMBODIMENTS

I. Definitions

Figure 1:
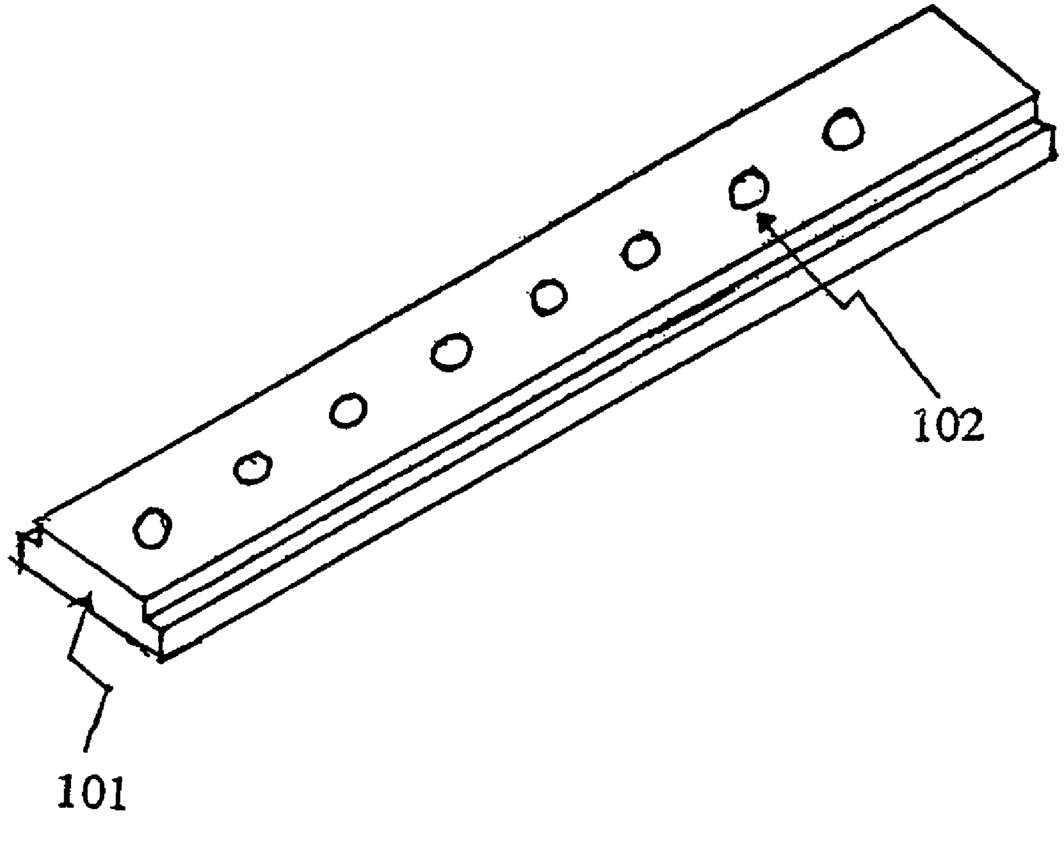
FIG. 1 shows a probe containing a plurality of adsorbent spots (e.g., hydrogel materials and/or uniform particles) in the form of a strip.

Unless defined otherwise, all technical and scientific terms used herein have the meaning commonly understood by a person skilled in the art to which this invention belongs. The following references provide one of skill with a general definition of many of the terms used in this invention: Singleton et al., *Dictionary of Microbiology and Molecular*

*Biology* ($2^{nd}$ ed. 1994); *The Cambridge Dictionary of Science and Technology* (Walker ed., 1988); *The Glossary of Genetics*, $5^{th}$ Ed., R. Rieger et al. (eds.), Springer Verlag (1991); and Hale & Marham, *The Harper Collins Dictionary of Biology* (1991). As used herein, the following terms have the meanings ascribed to them unless specified otherwise.

"Probe" refers to a device that is removably insertable into a gas phase spectrometer and comprises a substrate having a surface for presenting analytes for detection. A probe can comprise a single substrate or a plurality of substrates. Terms such as ProteinChip™, ProteinChip™ array, or chip are also used herein to refer to specific kinds of probes.

"Substrate" refers to a material that is capable of supporting a hydrogel material or a plurality of uniform particles.

"Particle" encompasses spheres, spheroids, beads and other shapes as well and is used interchangeably with such terms unless otherwise specified.

"Surface" refers to the exterior or upper boundary of a body or a substrate.

"Microporous" refers to having very fine pores having a diameter of equal to or less than about 1000 Å.

"Strip" refers to a long narrow piece of a material that is substantially flat or planar.

"Plate" refers to a thin piece of material that is substantially flat or planar, and it can be in any suitable shape (e.g., rectangular, square, oblong, circular, etc.).

"Substantially flat" refers to a substrate having the major surfaces essentially parallel and distinctly greater than the minor surfaces (e.g., a strip or a plate).

"Substantially uniform" particles relate to a plurality of particles having a coefficient of diameter variation of less than about 5%. The diameter of a plurality of particles can be measured by any suitable means known in the art, such as transmission microscopy, and the coefficient of diameter variation can then be calculated. The coefficient of variation refers to the ratio of the standard deviation divided by the mean, multiplied by 100, so that it is expressed as a percent.

"Electrically conducting" refers to a material that is capable of transmitting electricity or electrons.

"Placed" as applied to the physical relationship between a substrate and hydrogel materials or uniform particles relates to, e.g., positioning, coating, covering, or layering of hydrogel materials or uniform particles onto the substrate surface.

"Gas phase ion spectrometer" refers to an apparatus that measures a parameter which can be translated into mass-to-charge ratios of ions formed when a sample is ionized into the gas phase. Generally ions of interest bear a single charge, and mass-to-charge ratios are often simply referred to as mass.

"Mass spectrometer" refers to a gas phase ion spectrometer that includes an inlet system, an ionization source, an ion optic assembly, a mass analyzer, and a detector.

"Laser desorption mass spectrometer" refers to a mass spectrometer which uses laser as an ionization source to desorb an analyte.

"Hydrogel material" refers to a water-insoluble and water-swellable polymer that is crosslinked and is capable of absorbing at least 10 times, preferably at least 100 times, its own weight of a liquid.

"Binding functionalities" refer to functional group(s) of a hydrogel material that bind analytes. Binding functionalities can include, but are not limited to, a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, derivatives thereof, or any combinations thereof. Binding functionalities can further include other adsorbents that bind analytes based on individual structural properties, such as the interaction of antibodies with antigens, enzymes with substrate analogs, nucleic acids with binding proteins, and hormones with receptors.

"Analyte" refers to a component of a sample which is desirably retained and detected. The term can refer to a single component or a set of components in the sample.

"Conditioned" as applied to the present invention relates to adaptation or modification of a substrate surface to promote adhesion of a hydrogel material or uniform particles onto the substrate surface.

"Sol gel" refers to material that is gelatinous when applied, but when cured, becomes a solid that typically resists shear stresses in any of its three dimensions.

"Coupling agent" refers to any chemical substance designed to react with substrates to form or promote a stronger bond at the interface.

"Derivative" refers to a compound that is made from another compound. For example, a derivative is a compound obtained from another compound by a simple chemical process (e.g., substitution of one or more substituents of a compound with another substituent).

"Substituted" refers to replacing an atom or a group of atoms for another.

"Carboxyl group" refers to any chemical moiety that has a carboxylic acid or salts of a carboxylic acid.

"Ammonium group" refers to any chemical moiety that has a substituted amine or salts of a substituted amine.

"Sulfonate group" refers to any chemical moiety that has a sulfonic acid or salts of a sulfonic acid.

"Phosphate group" refers to any chemical moiety that has a phosphoric acid or salts of a phosphoric acid.

"Homopolymer" refers to a polymer derived from a single type of monomers.

"Copolymer" refers to a polymer produced by the simultaneous polymerization of two or more dissimilar monomers.

"Blended polymer" refers to a mixture of different types of polymers.

"Crosslinking agent" refers to a compound that is capable of forming a chemical bond between the adjacent molecular chains of a given polymer at various positions by covalent bonds.

"Adsorb" refers to the detectable binding between binding functionalities of an adsorbent (e.g., a hydrogel material or uniform particles) and an analyte either before or after washing with an eluant (selectivity threshold modifier).

"Resolve," "resolution," or "resolution of analyte" refers to the detection of at least one analyte in a sample. Resolution includes the detection of a plurality of analytes in a sample by separation and subsequent differential detection. Resolution does not require the complete separation of an analyte from all other analytes in a mixture. Rather, any separation that allows the distinction between at least two analytes suffices.

"Detect" refers to identifying the presence, absence or amount of the object to be detected.

"Complex" refers to analytes formed by the union of two or more analytes.

"Biological sample" refers to a sample derived from a virus, cell, tissue, organ or organism including, without limitation, cell, tissue or organ lysates or homogenates, or body fluid samples, such as blood, urine or cerebrospinal fluid.

"Organic biomolecule" refers to an organic molecule of biological origin, e.g., steroids, amino acids, nucleotides, sugars, polypeptides, polynucleotides, complex carbohydrates or lipids.

"Small organic molecule" refers to organic molecules of a size comparable to those organic molecules generally used in pharmaceuticals. The term excludes organic biopolymers (e.g., proteins, nucleic acids, etc.). Preferred small organic molecules range in size up to about 5000 Da, up to about 2000 Da, or up to about 1000 Da.

"Biopolymer" refers to a polymer or an oligomer of biological origin, e.g., polypeptides or oligopeptides, polynucleotides or oligonucleotides, polysaccharides or oligosaccharides, polyglycerides or oligoglycerides.

"Energy absorbing molecule" or "EAM" refers to a molecule that absorbs energy from an ionization source in a mass spectrometer thereby enabling desorption of analyte from a probe surface. Energy absorbing molecules used in MALDI are frequently referred to as "matrix." Cinnamic acid derivatives, sinapinic acid ("SPA"), cyano hydroxy cinnamic acid ("CHCA") and dihydroxybenzoic acid are frequently used as energy absorbing molecules in laser desorption of bioorganic molecules. Other suitable energy absorbing molecules are known to those skilled in this art. See, e.g., U.S. Pat. No. 5,719,060 (Hutchens & Yip) for additional description of energy absorbing molecules.

II. Probe

A probe of the present invention is adapted to be removably insertable into a mass spectrometer. In one aspect of the invention, the probe comprises a substrate and a hydrogel material placed on the surface of the substrate. The hydrogel provides a three dimensional scaffolding from which distinct chemical or biological moieties (binding functionalities) are attached. During the assay, these moieties capture analytes (such as peptides, proteins, low molecular weight ligands, enzymes or inhibitors) through, e.g., specific chemical or biological interactions. Other approaches to making SELDI surfaces rely on a two dimensional presentation of the chemical or biological moieties, considerably limiting the active functional groups or binding functionalities per unit area. In contrast, the hydrogel provides a three dimensional scaffolding from which the moieties are presented, increasing the number of functional groups (or binding functionalities) per unit area. This results in a probe surface with a significantly higher capacity and may lead to increased sensitivity of detection. Additionally, the hydrophilic nature of the backbone of the hydrogel decreases the non-specific binding of biomolecules, such as proteins, to the hydrogel polymer backbone. Not wishing to be bound by a theory, a hydrogel material allows analytes to be surrounded by water and minimizes or eliminates non-specific binding associated with the hydrogel polymer backbone. Moreover, the porous nature of a hydrogel material allows unbound sample components to be readily washed out during a wash step. In one embodiment, to create the hydrogel on the probe surface, a monomer solution is deposited directly onto a substrate surface and then polymerized. In certain embodiments monomers are pre-functionalized to provide binding functionalities.

In another aspect of the invention, the probe comprises a substrate and a plurality of uniform particles on the surface of the substrate. The particles comprise binding functionalities for binding with an analyte detectable by the gas phase ion spectrometer. Uniformity of particles provides consistent mass resolutions and intensities of analytes bound on the binding functionalities of the particles.

The binding functionalities typically differ in their mode of attracting analytes, and thus provide means to selectively capture the analytes. The mode of attraction between the binding functionalities include, for example, (1) a salt-promoted interaction, e.g., hydrophobic interactions, thiophilic interactions, and immobilized dye interactions; (2) hydrogen bonding and/or van der Waals forces interactions and charge transfer interactions, such as in the case of a hydrophilic interactions; (3) electrostatic interactions, such as an ionic charge interaction, particularly positive or negative ionic charge interactions; (4) the ability of the analyte to form coordinate bonds with a metal ion (e.g., copper, nickel, cobalt, zinc, iron, aluminum, calcium etc.) on the metal chelating group; (5) reversible covalent interactions, for example, disulfide exchange interactions; (6) nonreversible covalent interactions, such as an acid labile ester group or a photochemically labile group (e.g., orthonitro benzyl); (7) enzyme-active site binding interactions (e.g., between trypsin immobilized to a hydrogel material and trypsin inhibitor); (8) glycoprotein interactions (e.g., between lectins immobilized to hydrogel materials and carbohydrate moieties on macromolecules); (9) biospecific interactions (e.g., between antibodies immobilized to hydrogel materials and antigens); or (10) combinations of two or more of the foregoing modes of interaction. See, e.g., WO98/59361 (Hutchens & Yip) for examples of analytes involved in the above interactions.

By exposing a sample to the hydrogel materials or the uniform particles having various binding functionalities, different components of the sample can be selectively attracted and bound. Therefore, the components of the sample can be separated and resolved by a gas phase ion spectrometer. In some cases, a primary analyte adsorbed to the hydrogel material or the uniform particles (e.g., via a reactive group) can be used to attract and bind secondary analytes.

A. Substrate

The probe substrate can be made of any suitable material that is capable of supporting hydrogel materials or uniform particles. For example, the probe substrate material can include, but is not limited to, insulating materials (e.g., glass such as silicon oxide, ceramic), semi-conducting materials (e.g., silicon wafers), or electrically conducting materials (e.g., metals, such as nickel, brass, steel, aluminum, gold, or electrically conductive polymers), organic polymers, biopolymers, paper, membrane, a composite of metal and polymers, or any combinations thereof.

The substrate can have various properties. For example, the substrate can be porous or non-porous (e.g., solid). It can also be substantially rigid or flexible (e.g., membrane). In one embodiment of the invention, the substrate is non-porous and substantially rigid to provide structural stability. In another embodiment, the substrate is microporous or porous. Furthermore, the substrate can be electrically insulating, conducting, or semi-conducting. In a preferred embodiment, the substrate is electrically conducting to reduce surface charge and to improve mass resolution. The substrate can be made electrically conductive by incorporating materials, such as electrically conductive polymers (e.g., carbonized polyetherether ketone, polyacetylenes, polyphenylenes, polypyrroles, polyanilines, polythiophenes, etc.), or conductive particulate fillers (e.g., carbon black, metallic powders, conductive polymer particulates, etc.).

The substrate can be in any shape as long as it allows the probe to be removably insertable into a gas phase ion spectrometer. In one embodiment, the substrate is substantially planar. In another embodiment, the substrate is substantially smooth. In yet another embodiment, the substrate is substantially flat and substantially rigid. For example, as shown in FIG. 1, the substrate can be in the form of a strip (101). The substrate can also be in the form of a plate. Furthermore, the substrate can have a thickness of between about 0.1 mm to about 10 cm or more, optionally between about 0.5 mm to about 1 cm or more, optionally between about 0.8 mm and about 0.5 cm, or optionally between about 1 mm to about 2.5 mm. Preferably, the substrate itself is large enough so that it is capable being hand-held. For example, the longest cross dimension (e.g., a diagonal) of the substrate can be at least about 1 cm or more, preferably about 2 cm or more, most preferably at least about 5 cm or more.

If the substrate is in a shape that alone is not readily removably insertable into a gas phase ion spectrometer, the substrate can further comprise a supporting element which allows the probe to be removably insertable into a gas phase ion spectrometer. The supporting element can also be used in combination with substrates that are flexible (e.g., a membrane) to assist the probe to be readily removably insertable into a gas phase ion spectrometer and to stably present the sample to the energy beam of a gas phase ion spectrometer. For example, the supporting element can be a substantially rigid material, such as a platen or a container (e.g., commercially available microtiter containers having 96 or 384 wells). If immobilization between the substrate and the supporting element is desired, they can be coupled by any suitable methods known in the art, e.g., an adhesive bonding, a covalent bonding, electrostatic bonding, etc. Moreover, the supporting element is preferably large enough so that it is capable of being hand-held. For example, the longest cross dimension (e.g., a diagonal) of the supporting element can be at least about 1 cm or more, preferably at least about 2 cm or more, most preferably at least about 5 cm or more. One advantage of this embodiment is that the analyte can be adsorbed to the substrate in one physical context, and transferred to the supporting element for analysis by gas phase ion spectrometry.

The probe can also be adapted for use with inlet systems and detectors of a gas phase ion spectrometer. For example, the probe can be adapted for mounting in a horizontally and/or vertically translatable carriage that horizontally and/or vertically moves the probe to a successive position without requiring repositioning of the probe by hand.

The surface of the substrate can be conditioned to promote adhesion of the hydrogel materials or the uniform particles. In one embodiment, the surface of the substrate can be conditioned to be rough, microporous, or porous by any methods known in the art, e.g., laser etching, chemical etching, sputter etching, wire brushing, sandblasting, etc. Preferably, the surface is conditioned via laser etching. For example, a substrate such as metal can be etched via laser. Laser etching can provide a substrate surface that has a mean height variation of about 10 micro-inches to about 1000 micro-inches or more, preferably about 100 micro-inches to about 500 micro-inches or more, most preferably about 150 micro-inches to about 400 micro-inches or more. Not wishing to be bound by a theory, a roughened or microporous surface of a substrate can assist physical capturing of the hydrogel materials or the uniform particles onto the substrate surface.

In another embodiment, the surface of the substrate can be conditioned chemically to promote adhesion of the hydrogel materials or the uniform particles. Adhesion can be achieved by, e.g., covalent, non-covalent, or electrostatic interactions. For example, the surface can be conditioned by incorporating adhesion promoting coatings, such as a metal coating, an oxide coating, a sol gel, or a glass coating. A coupling agent (e.g., silane or titanium-based agents) can also be used. In certain embodiments, the surface is conditioned with a non-conductive coating (e.g., glass coating), thereby providing a substrate surface that is non-conductive. In other embodiments, the thickness of a coating (e.g., a glass coating) on the probe surface is between about 6 Angstroms to about 9 Angtroms. If metal is used as a substrate, a coupling agent can be organometallic compounds having zirconium or silicon active moieties (see, e.g., U.S. Pat. No. 5,869,140 (Blohowiak et al.)).

In yet another embodiment, the surface of the substrate can be conditioned by roughening and chemically. For example, a metal substrate can be roughened via laser etching and then coated with a glass coating.

B. Hydrogel Materials Comprising Binding Functionalities

In one aspect of the invention, the probe comprises a hydrogel material on the substrate surface. The hydrogel material comprises binding functionalities for binding with an analyte detectable by the gas phase ion spectrometer. The hydrogel material, as used herein, refers to a water-insoluble and water-swellable polymer that is crosslinked and is capable of absorbing at least 10 times, preferably at least 100 times, its own weight of a liquid. By swelling upon infusion of a liquid, a hydrogel material provide a three dimensional scaffolding from which the binding functionalities are presented, thereby increasing capacity of analyte binding which may lead to an increased sensitivity of detection. The hydrophilic nature of the hydrogel material also decreases non-specific binding of biomolecules, such as proteins, to the hydrogel polymer backbone. Not wishing to be bound by a theory, a hydrogel material allows analytes to be surrounded by water and minimizes or eliminates non-specific binding associated with the hydrogel polymer backbone. Moreover, the porous nature of a hydrogel material allows unbound sample components to be readily washed out during a wash step.

The hydrogel material can be on the substrate surface in a number of manners. In one embodiment, the hydrogel material can be disposed directly on the substrate surface (e.g., disposed on a monolithic glass substrate or on a monolithic aluminum substrate). In another embodiment, the hydrogel material can be disposed on the conditioned substrate surface. For example, the substrate surface can be conditioned with adhesion promoting coatings described above (e.g., a glass coating), and the hydrogel material can be disposed on the glass coating. In the context of the present invention, all of these embodiments are regarded as having the hydrogel material "on" the surface of the substrate.

Typically, the thickness of the coating on the substrate (e.g., glass coating) and the hydrogel material combined is at least about 1 micrometer thick, at least about 10 micrometer thick, at least about 20 micrometer thick, at least about 50 micrometer thick, or at least about 100 micrometer thick. In certain embodiments, the thickness of the hydrogel material itself is at least about 1 micrometer thick, at least about 10 micrometer thick, at least about 20 micrometer thick, at least about 50 micrometer thick, or at least about 100 micrometer thick. In other embodiments, the thickness of the hydrogel materials is in the range of about 50 to 100 micrometer. The selection of the thickness of the coating and/or the hydrogel material may depend on experimental conditions or binding capacity desired, and can be determined by one of skill in the art.

A number of hydrogel materials are suitable for use in the present invention. Suitable hydrogel materials include, but are not limited to, starch graft copolymers, cross-linked carboxymethylcellulose derivatives and modified hydrophilic polyacrylates. Exemplary hydrogel materials include hydrolyzed starch-acrylonitrile graft copolymer, a neutralized starch-acrylic acid graft copolymer, a saponified acrylic acid ester-vinyl acetate copolymer, a hydrolyzed acrylonitrile copolymer or acrylamide copolymer, a modified cross-linked polyvinyl alcohol, a neutralized self-cross-linking polyacrylic acid, a cross-linked polyacrylate salt, carboxylated cellulose, a neutralized cross-linked isobutylene-maleic anhydride copolymer, or derivatives thereof. Any of the above hydrogel materials can be used as long as they provide binding functionalities for binding analytes.

The binding functionalities of the hydrogel materials can include, for example, a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, or derivatives thereof.

The hydrogel material comprising binding functionalities can be derived from various monomers. Synthesis of monomers having selected binding functionalities is within the skill of those in the art. See, e.g., *Advanced Organic Chemistry, Reactions Mechanisms, and Structure,* $4^{th}$ Ed. by March (John Wiley & Sons, New York (1992)). Some of the monomers are also commercially available from, e.g., Sigma, Aldrich, or other sources. Since the monomers can be pre-functionalized with desired binding functionalities, there is no need for a post-modification of polymerized hydrogel materials to include binding functionalities. However, if desired, the polymerized hydrogel materials can be post-modified to incorporate another binding functionalities (e.g., specific ligands capable of binding biomolecules).

Preferably, hydrogel materials are derived from substituted acrylamide monomers, substituted acrylate monomers, or derivatives thereof, because they can be readily modified to produce hydrogel materials comprising a number of different binding functionalities.

Specifically, the hydrogel materials comprising a carboxyl group as binding functionalities can be derived from substituted acrylamide or substituted acrylate monomers, such as (meth)acrylic acid, 2-carboxyethyl acrylate, N-acryloylaminohexanoic acid, N-carboxymethylacrylamide, 2-acrylamidoglycolic acid, or derivatives thereof.

The hydrogel materials comprising a sulfonate group as binding functionalities can be derived from, e.g., acrylamidomethyl-propane sulfonic acid monomers, or derivatives thereof.

The hydrogel materials comprising a phosphate group as binding functionalities can be derived from, e.g., N-phosphoethyl acrylamide monomers, or derivatives thereof.

The hydrogel materials comprising an ammonium group as binding functionalities can be derived from, e.g., trimethylaminoethyl methacrylate, diethylaminoethyl methacrylate, diethylaminoethyl acrylamide, diethylaminoethyl methacrylamide, diethylaminopropyl methacrylamide, aminopropyl acrylamide, 3-(methacryloylamino)propyltrimethylammonium chloride, 2-aminoethyl methacrylate, N-(3-aminopropyl)methacrylamide, 2-(t-butylamino)ethyl methacrylate, 2-(N, N-dimethylamino)ethyl (meth)acrylate, N-(2-(N, N-dimethylamino))ethyl (meth)acrylamide, N-(3-(N, N-dimethylamino))propyl methacrylamide, 2-(meth)acryloyloxyethyltrimethylammonium chloride, 3-methacryloyloxy-2-hydroxypropyltrimethylammonium chloride, (2-acryloyloxyethyl)(4-benzoylbenzyl)dimethylammonium bromide, 2-vinylpyridine, 4-vinylpyridine, vinylimidazole, or derivatives thereof.

The hydrogel materials comprising a hydrophilic group as binding functionalities can be derived from, e.g., N-(meth)acryloyltris (hydroxymethyl) methylamine, hydroxyethyl acrylamide, hydroxypropyl methacrylamide, N-acrylamido-1-deoxysorbitol, hydroxyethyl(meth)acrylate, hydroxypropylacrylate, hydroxyphenylnethacrylate, polyethylene glycol monomethacrylate, polyethylene glycol dimethacrylate, acrylamide, glycerol mono(meth)acrylate, 2-hydroxypropyl acrylate, 4-hydroxybutyl methacrylate, 2-methacryloxyethyl glucoside, poly(ethyleneglycol) monomethyl ether monomethacrylate, vinyl 4-hydroxybutyl ether, or derivatives thereof.

The hydrogel materials comprising a hydrophobic group as binding functionalities can be derived from, e.g., N, N-dimethyl acrylamide, N, N-diethyl (meth)acrylamide, N-methyl methacrylamide, N-ethyl methacrylamide, N-propyl acrylamide, N-butyl acrylamide, N-octyl (meth)acrylamide, N-dodecyl methacrylamide, N-octadecyl acrylamide, propyl (meth)acrylate, decyl (meth)acrylate, stearyl (meth) acrylate, octyl-triphenylmethylacrylamide, butyl-triphenylmethylacrylamide, octadedcyl-triphenylmethylacrylamide, phenyl-triphenylmethylacrylamide, benzyl-triphenylmethylacrylamide, or derivatives thereof.

The hydrogel materials comprising a metal chelating group as binding functionalities can be derived from, e.g., N-(3-N, N-biscarboxymethylamino)propyl methacrylamide, 5-methacrylamido-2-(N, N-biscarboxymethylamino)pentanoic acid, N-(acrylamidoethyl)ethylenediamine N, N', N'-triacetic acid, or derivatives thereof.

The hydrogel materials comprising a reactive group as binding functionalities can be derived from, e.g., glycidyl acrylate, acryloyl chloride, glycidyl(meth)acrylate, (meth) acryloyl chloride, N-acryloxysuccinimide, vinyl azlactone, acrylamidopropyl pyridyl disulfide, N-(acrylamidopropyl) maleimide, acrylamidodeoxy sorbitol activated with bis-epoxirane compounds, allylchloroformate, (meth)acrylic anhydride, acrolein, allylsuccinic anhydride, citraconic anhydride, allyl glycidyl ether, or derivatives thereof.

The hydrogel materials comprising a thioether group as binding functionalities can be derived from thiophilic monomers, e.g., 2-hydroxy-3-mercaptopyridylpropyl (methacrylate), 2-(2-3-(meth)acryloxyethoxy) ethanesulfonyl)ethylsulfanyl ethanol, or derivatives thereof.

The hydrogel materials comprising a biotin group as binding functionalities can be derived from biotin monomers, e.g., n-biotinyl-3-(meth)acrylamidopropylamine, or derivatives thereof.

The hydrogel materials comprising a dye group as binding functionalities can be derived from dye monomers, e.g., N-(N'-dye coupled aminopropyl)(meth)acrylamide. A dye can be selected from any suitable dyes, e.g., cibacron blue.

The hydrogel materials comprising a boronate group as binding functionalities can be derived from boronate monomers, e.g., N-(m-dihydroxyboryl)phenyl (meth)acrylamide, or derivatives thereof.

The hydrogel materials comprising a cholesterol group as binding functionalities can be derived from cholesterol monomers, e.g., N-cholesteryl-3-(meth)acrylamidopropylamine.

If desired, some of the binding functionalities can be attached after the polymerization step, i.e., by post-modification of hydrogel materials. For example, a thioether group can be produced by modifying a hydroxyl group of a hydrogel material. Another example is modifying a hydrogel material comprising activated esters or acid chloride to produce a hydrogel material with a hydrazide group. Still further, another example is a hydroxyl group or a reactive group of a hydrogel material modified to produce a hydrogel material comprising, e.g., a dye group, a lectin group, or a heparin group as binding functionalities. Moreover, binding functionalities can be attached to a hydrogel material by using conjugating compounds, such as zero-length, homo- or hetero-bifunctional crosslinking reagents. Examples of the crosslinking reagents include, e.g., succinimidyl esters, maleimides, iodoacetamides, carbodiimides, aldehydes and glyoxals, epoxides and oxiranes, carbonyldiimidazole, or anhybrides. These conjugating reagents can be particularly useful when it is desired to control the chemistry of reactions of the functional groups.

Each of the above monomers can be polymerized on its own to produce a homopolymer or with other monomers to produce a copolymer. Blends of polymers can also be used. Copolymers or blended polymers are particularly useful when hydrogel materials with mixed binding functionalities are desired. For example, when a hydrogel material with a hydrophobic group and a carboxyl group is desired, monomers such as N, N-dimethyl acrylamide and (meth)acrylic acid can be mixed and polymerized together. Alternatively, a hydrogel homopolymer derived from N, N-dimethyl acrylamide and a hydrogel homopolymer derived from (meth) acrylic acid can be blended together. In producing copolymers or blended polymers, the proportion of monomers or polymers, respectively, can be varied to control the amount of binding functionalities desired.

The binding characteristics of a hydrogel material can further be modified by adding other additives. For example, the monomers to be polymerized may incorporate therein a hydrophilic polymeric compound such as starch or cellulose, starch derivatives or cellulose derivatives, dextran, agarose, polyvinyl alcohol, polyacrylic acid (salt), or cross-linked polyacrylic acid (salt), a chain transfer agent such as hypophosphorous acid (salt), surfactants and foaming agents such as carbonates, etc.

Above monomers and additives can be mixed and polymerized using any suitable polymerization methods known in the art. For example, bulk polymerization or precipitation polymerization can be used. However, it is preferable to prepare the monomer in the form of an aqueous solution and subjecting the aqueous solution to solution polymerization or reversed-phase suspension polymerization from the viewpoint of the quality of product and the ease of control of polymerization. Such polymerization methods are described in, for example, U.S. Pat. No. 4,625,001 (Tsubakimoto et al.), U.S. Pat. No. 4,769,427 (Nowakowsky et al.), U.S. Pat. No. 4,873,299 (Nowakowsky et al.), U.S. Pat. No. 4,093,776 (Aoki et al.), U.S. Pat. No. 4,367,323 (Kitamura et al.), U.S. Pat. No. 4,446,261 (Yamasaki et al.), U.S. Pat. No. 4,552,938 (Mikita et al.), U.S. Pat. No. 4,654,393 (Mikita et al.), U.S. Pat. No. 4,683,274 (Nakamura et al.), U.S. Pat. No. 4,690,996 (Shih et al.), U.S. Pat. No. 4,721,647 (Nakanishi et al.), U.S. Pat. No. 4,738,867 (Itoh et al.), U.S. Pat. No. 4,748,076 (Saotome), U.S. Pat. No. 4,985,514 (Kimura et al.), U.S. Pat. No. 5,124,416 (Haruna et al.), and U.S. Pat. No. 5,250,640 (Irie et al.).

The amount of the monomers can be generally in the range of from about 1% by weight to about 40% by weight, preferably from about 3% by weight to about 25% by weight, and most preferably about 5% by weight to about 10% by weight, based on the weight of the final monomer mixture solution (e.g., including water, monomers, and other additives). An appropriate proportion of monomers and a crosslinking agent described herein can produce a crosslinked hydrogel material that is water-insoluble and water-swellable. Furthermore, the proportions of monomers and a crosslinking agent described herein can produce an open, porous three-dimensional polymeric network that allows analytes to rapidly penetrate and bind to binding functionalities. Unbound sample components can also readily be washed out through the porous three-dimensional polymeric network of hydrogel materials.

To the mixture of monomers and additives, a crosslinking agent can be added to the above monomers. The crosslinking agent, when necessary, may be used in the form of a combination of two or more members. It is preferable to use a compound having not less than two polymerizable unsaturated groups as a crosslinking agent. The crosslinking agent couples adjacent molecular chains of polymers, and thus results in hydrogel materials having a three-dimensional scaffolding from which binding functionalities are presented. The amount of the crosslinking agent can be generally in the range of about 3% to about 10% by weight of monomers. The optimal amount of the crosslinking agent varies depending on the amount of monomers used to produce a gel. For example, for a hydrogel material produced from about 40% by weight of monomers, less than about 3% by weight of a crosslinking agent can be used. For a hydrogel material produced from about 5% to about 25% by weight of monomers, about 2% to about 5% by weight, preferably about 3% by weight of a crosslinking agent, can be used.

Typical examples of the crosslinking agent include: N, N'-methylene-bis(meth)acrylamide, (poly)-ethylene glycol di(meth) acrylate, (poly)propylene glycol di(meth)acrylate, trimethylol-propane tri(meth)acrylate, trimethylolpropane di(meth) acrylate, glycerol tri(meth)acrylate, glycerol acrylate methacrylate, ethylene oxide-modified trimethylol propane tri(meth)acrylate, pentaerythritol tetra(meth)acrylate, dipentaerythritol hexa(meth)acrylate, triallyl cyanurate, triallyl isocyanurate, triallyl phosphate, triallyl amine, poly (meth)allyloxy alkane, (poly)ethylene glycol diglycidyl ether, glycerol diglycidyl ether, ethylene glycol, polyethylene glycol, propylene glycol, glycerol, pentaerythritol, ethylene diamine, polyethylene imine, ethylene carbonate, and glycidyl(meth)acrylate.

The polymerization can be initiated by adding a polymerization initiator to the monomer mixture solution comprising monomers, a crosslinking agent, and other additives. The concentration of initiator (expressed as percent weight per volume of initial monomer solution) is from about 0.1% to about 2%, preferably about 0.2% to about 0.8%. For instance, these initiators may be capable of generating free radicals. Suitable polymerization starters include both thermal and photoinitiators. Suitable thermal initiators include, e.g., ammonium persulfate/tetramethylethylene diamine (TEMED), 2,2'-azobis(2-amidino propane) hydrochloride, potassium persulfate/dimethylaminopropionitrile, 2,2'-azobis(isobutyronitrile), 4,4'-azobis-(4-cyanovaleric acid), and benzoylperoxide. Preferred thermal initiators are ammonium persulfate/tetramethyethylenediamine and 2,2'-azobis (isobutyronitrile). Photo-initiators include, e.g., isopropylthioxantone, 2-(2'-hydroxy-5'-methylphenyl)benzotriazole, 2,2'-dihydroxy-4-methoxybenzophenone, and riboflavin. When using a photo-initiator, accelerants such as ammonium persulfate and/or TEMED can be used to accelerate the polymerization process.

In one embodiment, a monomer solution is in situ polymerized on the substrate surface to produce hydrogel materials. The in situ polymerization process provides several advantages. First, the amount of hydrogel materials can be readily controlled by adjusting the amount of a monomer solution placed on the substrate surface, thereby controlling the amount of binding functionalities available. For example, the amount of a monomer solution deposited onto the substrate surface can be controlled by using methods such as pipetting, ink jet, silk screen, electro spray, spin coating, or chemical vapor deposition. Second, the height of hydrogel materials from the substrate surface can also be controlled, thereby providing a relatively uniform height from the substrate surface. Not wishing to be bound by a theory, uniformity in the hydrogel material height may provide a more accurate time-of-flight analysis of samples, since all analytes bound on the probe surface are equidistant from an energy source of a gas phase ion spectrometer.

For in situ polymerization of monomers, photoinitiation of polymerization is preferred. For example, monomers, a crosslinking agent, and a photo-initiator are mixed in water and then degassed. Thereafter, freshly mixed ammonium persulfate or other accelerants are added. The monomer solution is deposited onto a substrate, and then the mixture solution is in situ polymerized on the substrate surface by irradiating, e.g., by UV exposure. The monomer mixture solution can be subsequently dried by any of the known methods such as air drying, drying with steam, infrared drying, vacuum drying, etc. If desired, certain hydrogel materials can be treated for storage. For example, a probe comprising a hydrogel material containing a carboxyl group can be stored in the salt form with sodium as the counter-ion.

C. Uniform Particles Comprising Binding Functionalities

In another aspect of the invention, the probe comprises a substrate and a plurality of particles that are uniform in diameter placed on the substrate surface. The particles comprise binding functionalities for binding with an analyte detectable by the gas phase ion spectrometer. An average diameter or size of the particle can range between about 0.01 μm to about 1000 μm, preferably between about 0.1 μm to about 100 μm, more preferably about 1 μm to about 10 μm. To provide consistent mass resolutions and intensities, the particles are preferably uniform in size or diameter. For example, the particles can have a coefficient of diameter variation of less than about 5%, preferably less than about 3%, more preferably less than about 1%.

The particles can be made from any suitable materials that is capable of providing binding functionalities. The material includes, e.g., crosslinked polymers of polystyrenes, polysaccharides, agarose, dextran, methacrylates, functionalized silicon dioxide. Some of these uniform particles are referred to as latex beads and are commercially available from, e.g., Bangs Laboratories, Inc. (Fishers, Ind.) or 3M (Minneapolis, Minn.).

In one embodiment, the particles can be made of hydrogel materials comprising binding functionalities as described above (e.g., polymers or copolymers derived from substituted acrylamides or substituted acrylates). In another embodiment, non-hydrogel particles can be coated with hydrogel materials comprising binding functionalities.

The binding functionalities of the particles can include, for example, a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, or derivatives thereof. Synthesis of particles having desired binding functionalities is within the skill of those in the art. See, e.g., Advanced Organic Chemistry, Reactions Mechanisms, and Structure, $4^{th}$ Ed. by March (John Wiley & Sons, New York (1992)). Some of these uniform particles are also commercially available in the functionalized form.

D. Positioning of Hydrogel Materials or Uniform Particles on the Substrate

Hydrogel materials can be on a substrate discontinuously or continuously. If discontinuous, as few as one or as many as 10, 100, 1000, 10,000 or more spots of hydrogel materials can be on a single substrate. The size of the spots can be varied, depending on experimental design and purpose. However, it need not be larger than the diameter of the impinging energy source (e.g., laser spot diameter). For example, a spot can have a diameter of about 0.5 mm to about 5 mm, optionally about 1 mm to about 2 mm. The spots can continue with the same or different hydrogel materials. In some cases, it is advantageous to provide the same hydrogel material at multiple locations on the substrate to permit evaluation against a plurality of different eluants or so that the bound analyte can be preserved for future use. If the substrate is provided with a plurality of different hydrogel materials having different binding characteristics, it is possible to bind and to detect a wider variety of different analytes from a single sample. The use of a plurality of different hydrogel materials on a substrate for evaluation of a single sample is essentially equivalent to concurrently conducting multiple chromatographic experiments, each with a different chromatography column, but the present method has the advantage of requiring only a single system.

When the substrate includes a plurality of hydrogel materials, it is particularly useful to provide the hydrogel materials in predetermined addressable locations (see, e.g., hydrogel material 102 shown in FIG. 1). The addressable locations can be arranged in any pattern, but preferably in regular patterns, such as lines, orthogonal arrays, or regular curves, such as circles. By providing hydrogel materials in predetermined addressable locations, it is possible to wash each location of hydrogel materials with a set of eluants, thereby modifying binding characteristics of hydrogel materials. Furthermore, when the probe is mounted in a translatable carriage, analytes bound to hydrogel materials at predetermined addressable locations can be moved to a successive position to assist analyte detection by a gas phase ion spectrometer.

Alternatively, hydrogel materials can be on the substrate continuously. In one embodiment, one type of hydrogel material can be placed throughout the surface of the substrate. In another embodiment, a plurality of hydrogel materials comprising different binding functionalities can be placed on the substrate in a one- or two-dimensional gradient. For example, a strip can be provided with a hydrogel material that is weakly hydrophobic at one end and strongly hydrophobic at the other end. Or, a plate can be provided with a hydrogel material that is weakly hydrophobic and anionic in one corner, and strongly hydrophobic and anionic in the diagonally opposite corner. These gradients can be achieved by any methods known in the art. For example, gradients can be achieved by a controlled spray application or by flowing material across a surface in a time-wise manner to allow incremental completion of a reaction over the dimension of the gradient. Additionally, a photochemical reactive group can be combined with irradiation to create a stepwise gradient. This process can be repeated, at right angles, to provide orthogonal gradients of similar or different hydrogel materials with different binding functionalities.

The above discussions regarding positioning of hydrogel materials also apply to positioning of uniform particles onto a substrate and will not be repeated.

III. Selection and Detection of Analytes

The above described system can be used to selectively adsorb analytes from a sample and to detect the retained analytes by gas phase ion spectrometry. Analytes can be selectively adsorbed under a plurality of different selectivity conditions. For example, hydrogel materials or uniform particles having different binding functionalities selectively capture different analytes. In addition, eluants can modify the binding characteristics of hydrogel materials or uniform particles or analytes, and thus, provide different selectivity conditions for the same hydrogel materials or uniform particles or analytes. Each selectivity condition provides a first dimension of separation, separating adsorbed analytes from those that are not adsorbed. Gas phase ion spectrometry provides a second dimension of separation, separating adsorbed analytes from each other according to mass. This multidimensional separation provides both resolution of the analytes and their characterization, and this process is called retentate chromatography.

Retentate chromatography is distinct from conventional chromatography in several ways. First, in retentate chromatography, analytes which are retained on the adsorbents (e.g., hydrogel materials or uniform particles) are detected. In conventional chromatographic methods analytes are eluted off of the adsorbents prior to detection. There is no routine or convenient means for detecting analyte which is not eluted off the adsorbent in conventional chromatography. Thus, retentate chromatography provides direct information about chemical or structural characteristics of the retained analytes. Second, the coupling of adsorption chromatography with detection by desorption spectrometry provides extraordinary sensitivity, in the femtomolar range, and unusually fine resolution. Third, in part because it allows direct detection of analytes, retentate chromatography provides the ability to rapidly analyze retentates with a variety of different selectivity conditions, thus providing rapid, multi-dimensional characterization of analytes in a sample. Fourth, adsorbents (e.g., hydrogel materials or uniform particles) can be attached to a substrate in an array of pre-determined, addressable locations. This allows parallel processing of analytes exposed to different adsorbent sites (i.e., "affinity sites" or "spots") on the array under different elution conditions.

A. Exposing the Analyte to Selectivity Conditions

1. Contacting the Analyte to the Hydrogel Materials or to the Uniform Particles

The sample can be contacted to hydrogel materials either before or after the hydrogel materials are positioned on the substrate using any suitable method which will enable binding between the analyte and the hydrogel materials. The hydrogel materials can simply be admixed or combined with the sample. The sample can be contacted to the hydrogel materials by bathing or soaking the substrate in the sample, or dipping the substrate in the sample, or spraying the sample onto the substrate, by washing the sample over the substrate, or by generating the sample or analyte in contact with the hydrogel materials. In addition, the sample can be contacted to the hydrogel materials by solubilizing the sample in or admixing the sample with an eluant and contacting the solution of eluant and sample to the hydrogel materials using any of the foregoing and other techniques known in the art (e.g., bathing, soaking, dipping, spraying, or washing over, pipetting). Generally, a volume of sample containing from a few atommoles to 100 picomoles of analyte in about 1 μl to 500 μl is sufficient for binding to the hydrogel materials.

The sample should be contacted to the hydrogel material for a period of time sufficient to allow the analyte to bind to the hydrogel material. Typically, the sample is contacted with the hydrogel material for a period of between about 30 seconds and about 12 hours. Preferably, the sample is contacted to the hydrogel material for a period of between about 30 seconds and about 15 minutes.

The temperature at which the sample is contacted to the hydrogel material is a function of the particular sample and the hydrogel material selected. Typically, the sample is contacted to the hydrogel material under ambient temperature and pressure conditions. For some samples, however, modified temperature (typically 4° C. through 37° C.), and pressure conditions can be desirable and will be readily determinable by those skilled in the art.

The above discussions regarding contacting analytes to the hydrogel material also apply to contacting analytes to the uniform particles and will not be repeated.

2. Washing the Hydrogel Materials or the Uniform Particles with Eluants

After the sample is contacted with the analyte, resulting in the binding of the analyte to the hydrogel material, the hydrogel material is washed with eluant. Typically, to provide a multi-dimensional analysis, each hydrogel material location can be washed with a plurality of different eluants, thereby modifying the analyte population retained on a specified hydrogel material. The combination of the binding characteristics of the hydrogel material and the elution characteristics of the eluant provides the selectivity conditions which control the analytes retained by the hydrogel materials after washing. Thus, the washing step selectively removes sample components from the hydrogel materials.

Eluants can modify the binding characteristics of the hydrogel material. Eluants can modify the selectivity of the hydrogel material with respect to, e.g., charge or pH, ionic strength (e.g., due to the amount of salt in eluant), water structure (e.g., due to inclusion of urea and chaotropic salt solutions), concentrations of specific competitive binding reagents, surface tension (e.g., due to inclusion of detergents or surfactants), dielectric constant (e.g., due to inclusion of urea, propanol, acetonitrile, ethylene glycol, glycerol, detergents) and combinations of the above. See, e.g., WO98/59361 for other examples of eluants that can modify the binding characteristics of adsorbents in general.

Washing the hydrogel material with a bound analyte can be accomplished by, e.g., bathing, soaking, dipping, rinsing, spraying, or washing the substrate with the eluant. A microfluidics process is preferably used when an eluant is introduced to small spots of the hydrogel material.

The temperature at which the eluant is contacted to the hydrogel material is a function of the particular sample and the hydrogel material selected. Typically, the eluant is contacted to the hydrogel material at a temperature of between 0° C. and 100° C., preferably between 4° C. and 37° C. However, for some eluants, modified temperatures can be desirable and will be readily determinable by those skilled in the art.

When the analyte is bound to the hydrogel material at only one location and a plurality of different eluants are employed in the washing step, information regarding the selectivity of the hydrogel material in the presence of each eluant individually may be obtained. The analyte bound to the hydrogel material at one location may be determined after each washing with eluant by following a repeated pattern of washing with a first eluant, desorbing and detecting retained analyte, followed by washing with a second eluant, and desorbing and detecting retained analyte. The steps of washing followed by desorbing and detecting can be sequentially repeated for a plurality of different eluants using the same hydrogel material. In this manner the hydrogel material with retained analyte at a single location may be reexamined with a plurality of different eluants to provide a collection of information regarding the analytes retained after each individual washing.

The foregoing method is also useful when the hydrogel materials are provided at a plurality of predetermined addressable locations, whether the hydrogel materials are all the same or different. However, when the analyte is bound to either the same or different hydrogel materials at a plurality of locations, the washing step may alternatively be carried out using a more systematic and efficient approach involving parallel processing. In other words, all of the hydrogel materials are washed with an eluant and thereafter an analyte retained is desorbed and detected for each location of the hydrogel materials. If desired, the steps of washing all hydrogel material locations, followed by desorption and detection at each hydrogel material location can be repeated for a plurality of different eluants. In this manner, an entire array may be utilized to efficiently determine the character of analytes in a sample.

The above discussions regarding washing the hydrogel materials also apply to washing the uniform particles and will not be repeated.

B. Desorbing and Detecting Analytes

Bound analytes on the probes of the present invention can be analyzed using a gas phase ion spectrometer. This includes, e.g., mass spectrometers, ion mobility spectrometers, or total ion current measuring devices.

In one embodiment, a mass spectrometer is used with the probe of the present invention. A solid sample bound to the probe of the present invention is introduced into an inlet system of the mass spectrometer. The sample is then ionized by an ionization source. Typical ionization sources include, e.g., laser, fast atom bombardment, or plasma. The generated ions are collected by an ion optic assembly and then a mass analyzer disperses and analyzes the passing ions. The ions exiting the mass analyzer are detected by a detector. The detector then translates information of the detected ions into mass-to-charge ratios. Detection of an analyte will typically involve detection of signal intensity. This, in turn, reflects the quantity of analyte bound to the probe. For additional information regarding mass spectrometers, see, e.g., *Principles of Instrumental Analysis,* 3$^{rd}$ ed., Skoog, Saunders College Publishing, Philadelphia, 1985; and *Kirk-Othmer Encylopedia of Chemical Technology,* 4$^{th}$ ed. Vol. 15 (John Wiley & Sons, New York 1995), pp. 1071–1094.

In a preferred embodiment, a laser desorption time-of-flight mass spectrometer is used with the probe of the present invention. In laser desorption mass spectrometry, a sample on the probe is introduced into an inlet system. The sample is desorbed and ionized into the gas phase by laser from the ionization source. The ions generated are collected by an ion optic assembly, and then in a time-of-flight mass analyzer, ions are accelerated through a short high voltage field and let drift into a high vacuum chamber. At the far end of the high vacuum chamber, the accelerated ions strike a sensitive detector surface at a different time. Since the time-of-flight is a function of the mass of the ions, the elapsed time between ionization and impact can be used to identify the presence or absence of molecules of specific mass. As any person skilled in the art understands, any of these components of the laser desorption time-of-flight mass spectrometer can be combined with other components described herein in the assembly of mass spectrometer that employs various means of desorption, acceleration, detection, measurement of time, etc.

Furthermore, an ion mobility spectrometer can be used to analyze samples. The principle of ion mobility spectrometry is based on different mobility of ions. Specifically, ions of a sample produced by ionization move at different rates, due to their difference in, e.g., mass, charge, or shape, through a tube under the influence of an electric field. The ions (typically in the form of a current) are registered at the detector which can then be used to identify the sample. One advantage of ion mobility spectrometry is that it can operate at atmospheric pressure.

Still further, a total ion current measuring device can be used to analyze samples. This device can be used when the probe has a surface chemistry that allows only a single type of analytes to be bound. When a single type of analytes is bound on the probe, the total current generated from the ionized analyte reflects the nature of the analyte. The total ion current from the analyte can then be compared to stored total ion current of known compounds. Therefore, the identity of the analyte bound on the probe can be determined.

Data generated by desorption and detection of analytes can be analyzed with the use of a programmable digital computer. The computer program generally contains a readable medium that stores codes. Certain code is devoted to memory that includes the location of each feature on a probe, the identity of the hydrogel material (or the uniform particles) at that feature and the elution conditions used to wash the hydrogel material (or the uniform particles). Using this information, the program can then identify the set of features on the probe defining certain selectivity characteristics. The computer also contains code that receives as input, data on the strength of the signal at various molecular masses received from a particular addressable location on the probe. This data can indicate the number of analytes detected, optionally including for each analyte detected the strength of the signal and the determined molecular mass.

The computer also contains code that processes the data. This invention contemplates a variety of methods for processing the data. In one embodiment, this involves creating an analyte recognition profile. For example, data on the retention of a particular analyte identified by molecular mass can be sorted according to a particular binding characteristic (e.g., binding to anionic hydrogel materials or hydrophobic hydrogel materials). This collected data provides a profile of the chemical properties of the particular analyte. Retention characteristics reflect analyte function which, in turn, reflects structure. For example, retention to a metal chelating group can reflect the presence of histidine residues in a polypeptide analyte. Using data of the level of retention to a plurality of cationic and anionic hydrogel materials under elution at a variety of pH levels reveals information from which one can derive the isoelectric point of a protein. This, in turn, reflects the probable number of ionic amino acids in the protein. Accordingly, the computer can include code that transforms the binding information into structural information.

The computer program can also include code that receives instructions from a programmer as input. The progressive and logical pathway for selective desorption of analytes from specified, predetermined locations in the probe can be anticipated and programmed in advance.

The computer can transform the data into another format for presentation. Data analysis can include the steps of determining, e.g., signal strength as a function of feature position from the data collected, removing "outliers" (data deviating from a predetermined statistical distribution), and calculating the relative binding affinity of the analytes from the remaining data.

The resulting data can be displayed in a variety of formats. In one format, the strength of a signal is displayed on a graph as a function of molecular mass. In another format, referred to as "gel format," the strength of a signal is displayed along a linear axis intensity of darkness, resulting in an appearance similar to bands on a gel. In another format, signals reaching a certain threshold are presented as vertical lines or bars on a horizontal axis representing molecular mass. Accordingly, each bar represents an analyte detected. Data also can be presented in graphs of signal strength for an analyte grouped according to binding characteristic and/or elution characteristic.

C. Analytes

The present invention permits the resolution of analytes based upon a variety of biological, chemical, or physicochemical properties of the analyte and the use of appropriate selectivity conditions. The properties of analytes which can be exploited through the use of appropriate selectivity conditions include, for example, the hydrophobic index (or measure of hydrophobic residues in the analyte), the isoelectric point (i.e., the pH at which the analyte has no charge), the hydrophobic moment (or measure of amphipathicity of an analyte or the extent of asymmetry in the distribution of polar and nonpolar residues), the lateral dipole moment (or measure of asymmetry in the distribution of charge in the analyte), a molecular structure factor (accounting for the variation in surface contour of the analyte molecule such as the distribution of bulky side chains along the backbone of the molecule), secondary structure components (e.g., helix, parallel and antiparallel sheets), disulfide bands, solvent-exposed electron donor groups (e.g., His), aromaticity (or measure of pi-pi interaction among aromatic residues in the analyte) and the linear distance between charged atoms.

These are representative examples of the types of properties which can be exploited for the resolution of a given analyte from a sample by the selection of appropriate selectivity conditions. Other suitable properties of analytes which can form the basis for resolution of a particular analyte from the sample will be readily known and/or determinable by those skilled in the art.

Any types of samples can be analyzed. For example, samples can be in the solid, liquid, or gaseous state, although typically the sample will be in a liquid state. Solid or gaseous samples are preferably solubilized in a suitable solvent to provide a liquid sample according to techniques well within the skill of those in the art. The sample can be a biological composition, non-biological organic composition, or inorganic composition. The technique of the present invention is particularly useful for resolving analytes in a biological sample, particularly biological fluids and extracts; and for resolving analytes in non-biological organic compositions, particularly compositions of small organic and inorganic molecules.

The analytes may be molecules, multimeric molecular complexes, macromolecular assemblies, cells, subcellular organelles, viruses, molecular fragments, ions, or atoms. The analyte can be a single component of the sample or a class of structurally, chemically, biologically, or functionally related components having one or more characteristics (e.g., molecular weight, isoelectric point, ionic charge, hydrophobic/hydrophilic interaction, etc.) in common.

Specifically, examples of analytes include biological macromolecules such as peptides, proteins, enzymes, enzymes substrates, enzyme substrate analog, enzyme inhibitors, polynucleotides, oligonucleotides, nucleic acids, carbohydrates, oligosaccharides, polysaccharides, avidin, streptavidin, lectins, pepstatin, protease inhibitors, protein A, agglutinin, heparin, protein G, concanavalin; fragments of biological macromolecules set forth above, such as nucleic acid fragments, peptide fragments, and protein fragments; complexes of biological macromolecules set forth above, such as nucleic acid complexes, protein-DNA complexes, gene transcription complex, gene translation complex, membrane, liposomes, membrane receptors, receptor-ligand complexes, signaling pathway complexes, enzyme-substrate, enzyme inhibitors, peptide complexes, protein complexes, carbohydrate complexes, and polysaccharide complexes; small biological molecules such as amino acids, nucleotides, nucleosides, sugars, steroids, lipids, metal ions, drugs, hormones, amides, amines, carboxylic acids, vitamins and coenzymes, alcohols, aldehydes, ketones, fatty acids, porphyrins, carotenoids, plant growth regulators, phosphate esters and nucleoside diphospho-sugars, synthetic small molecules such as pharmaceutically or therapeutically effective agents, monomers, peptide analogs, steroid analogs, inhibitors, mutagens, carcinogens, antimitotic drugs, antibiotics, ionophores, antimetabolites, amino acid analogs, antibacterial agents, transport inhibitors, surface-active agents (surfactants), amine-containing combinatorial libraries, dyes, toxins, biotin, biotinylated compounds, DNA, RNA, lysine, acetylglucosamine, procion red, glutathione, adenosine monophosphate, mitochondrial and chloroplast function inhibitors, electron donors, carriers and acceptors, synthetic substrates and analogs for proteases, substrates and analogs for phosphatases, substrates and analogs for esterases and lipases and protein modification reagents; and synthetic polymers, oligomers, and copolymers such as polyalkylenes, polyamides, poly(meth)acrylates, polysulfones, polystyrenes, polyethers, polyvinyl ethers, polyvinyl esters, polycarbonates, polyvinyl halides, polysiloxanes, POMA, PEG, and copolymers of any two or more of the above.

EXAMPLES

The following examples are offered by way of illustration, not by way of limitation.

I. Examples of Probes

SAX-2 ProteinChip™, WCX-1 ProteinChip™ and IMAC-3 ProteinChip™ described below are available from Ciphergen Biosystems Inc., Palo Alto, Calif.

A. SAX-2 ProteinChip™ (Strong Anionic Exchanger, Cationic Surface)

Initially, it is noted that SAX-1 ProteinChip™ that was described in provisional application Ser. No. 60/131,652, filed Apr. 29, 1999, has been renamed as SAX-2 ProteinChip™ by Ciphergen Biosystems Inc. Thus, SAX-1 and SAX-2 ProteinChip™ are the same chip.

The surface of a metal substrate is conditioned by etching via laser (e.g., Quantred Company, Galaxy model, ND-YAG Laser, using emission line of 1.064 nm, power of 30–35 watts with a laser spot size of 0.005 inches, the laser source to surface distance of 12–14 inches; with a rate of scan of about 25 per mm per second). Then the etched surface of the metal substrate is coated with a glass coating.

3-(Methacryloylamino)propyl trimethylammonium chloride (15.0 wt %) and N,N'-methylenebisacrylamide (0.4 wt %) are photo-polymerized using (−)-riboflavin (0.01 wt %) as a photo-initiator and ammonium persulfate (0.2 wt %) as an accelerant. The monomer solution is deposited onto a rough etched, glass coated substrate (0.4 μL, twice) and is irradiated for 5 minutes with a near UV exposure system (Hg short arc lamp, 20 mW/cm$^2$ at 365 nm). The surface is washed with a solution of sodium chloride (1 M), and then the surface is washed twice with deionized water.

B. WCX-1 ProteinChip™ (Weak Cationic Exchanger, Anionic Surface)

The surface of the substrate is conditioned as described above.

2-Acrylamidoglycolic acid (15.0 wt %) and N,N'-methylenebisacrylamide (0.4 wt %) are photo-polymerized using (−)-riboflavin (0.01 wt %) as a photo-initiator and ammonium persulfate (0.2 wt %) as an accelerant. The monomer solution is deposited onto a rough etched, glass coated substrate (0.4 μL, twice) and is irradiated for 5 minutes with a near UV exposure system (Hg short arc lamp, 20 mW/cm$^2$ at 365 nm). The surface is washed with a solution of sodium chloride (1 M), and then the surface is washed twice with deionized water.

C. IMAC-3 ProteinChip™ (Immobilized Metal Affinity Capture, Nitrilotriacetic Acid on Surface)

The surface of the substrate is conditioned as described above.

5-Methacylamido-2-(N,N-biscarboxymethaylamino)pentanoic acid (7.5 wt %), acryloytri(hydroxymethyl)methylamine (7.5 wt %) and N,N'-methylenebisacrylamide (0.4 wt %) are photo-polymerized using (−)-riboflavin (0.02 wt %) as a photo-initiator. The monomer solution is deposited onto a rough etched, glass coated substrate (0.4 μL, twice) and is irradiated for 5 minutes with a near UV exposure system (Hg short arc lamp, 20 mW/cm$^2$ at 365 nm). The surface is washed with a solution of sodium chloride (1 M), and then the surface is washed twice with deionized water.

II. Protocols for Retentate Chromatography

A. Protocols for Using SAX-2 ProteinChip™

The SAX-2 probe contains quaternary ammonium groups (strong cationic moieties) on the surface. No pH cycling is necessary before sample application. The surface is prepared simply by equilibrating the spots in the binding buffer. The following protocol is exemplary, and suitable modifications will be readily apparent to those skilled in the art.

1. Draw an outline for each spot of hydrogel materials using a hydrophobic pen (e.g., ImmEdge™Pen, Vector Laboratories, Burlingame, Calif.).
2. Load 10 μL of a binding buffer to each spot and incubate on a high-frequency shaker (e.g., TOMMY MT-360 Microtube Mixer, Tomy Tech USA, Palo Alto, Calif.) at room temperature for 5 minutes. It is preferred that the buffer is not allowed to air dry.
3. Remove excess buffer from spots. It is preferred that surface of spots are not touched and that the spots are not allowed to dry. Repeat steps 2 and 3 one more time.
4. Load 2–3 μL of sample per spot. Sample can be prepared in the binding buffer.
5. Note: It is preferred that salts are avoided in the binding buffer. It is also preferred to include a non-ionic detergent in the binding and washing buffers (e.g., 0.1% OGP or Triton X-100) to reduce nonspecific binding.
6. Varying the pH and ionic strength of the binding and/or washing buffer can also modify ionic binding.
7. Place the probe in the plastic shipping tube, push a plug of wet tissue against the probe to keep it upright and close the cap to create a moist chamber.
8. Incubate the probe in the tube on a high-frequency shaker for 20 to 30 minutes. Secure tube on the shaker with adhesive tape. (Note: Incubating the probe on a high-frequency shaker can improve binding efficiency, however, if a shaker is not available, the probe can also be incubated in a moist chamber for 30 minutes to 1 hour.)
9. Wash each spot with 5 μL of binding buffer five times, followed by a quick wash with water (5 μL two times).
10. Wipe dry around spots. Add 0.5 μL of saturated EAM solution to each spot when it is still moist. Air dry. Apply a second aliquot of 0.5 μL EAM solution to each spot. Air dry.
11. Analyze the probe using a mass spectrometer (e.g., SELDI™ Protein Biology System). (Note: If the EAM peak interferes with the sample peaks in the low-mass region then one addition of EAM can be tried first. In addition, the intensity of the instrument can also be decreased to reduce the EAM signal.)

Recommended buffers for the above protocol are 20 to 100 mM sodium or ammonium acetate, Tris HCl and 50 mM Tris base (for pH>9) buffers containing a non-ionic detergent (e.g. 0.1% Triton X-100).

B. Protocols for Using the WCX-1 ProteinChip™

The WCX-1 probe contains carboxylate groups (weak anionic moieties) on the surface and can be stored in the salt form with sodium as the counter-ion. To minimize the sodium adduct peaks in the mass spectra, it is recommended that the probe be pretreated with a buffer containing a volatile salt (e.g., an ammonium acetate buffer) before loading the sample. The following protocol is exemplary, and suitable modifications will be readily apparent to those skilled in the art.

1. Pretreat the probe by washing with 10 mL of 10 mM hydrochloric acid on a rocker for 5 minutes. Rinse with 10 mL of water three times. Wipe dry around spots.
2. Draw an outline for each spot of hydrogel materials using a hydrophobic pen (e.g., ImmEdge™Pen, Vector Laboratories, Burlingame, Calif.).
3. Load 10 μL of 100 mM ammonium acetate pH 6.5 (or at the pH of the binding buffer) to each spot and incubate on a high-frequency shaker (e.g., TOMMY MT-360 Microtube Mixer, Tomy Tech USA, Palo Alto, Calif.) at room temperature for 5 minutes. It is preferred that the buffer is not allowed to air dry.
4. Remove excess buffer from spots. It is preferred that surface of spots is not touched and that the spots are not allowed to dry. Repeat steps 3 and 4 one more time.
5. Load 2–3 μL of sample per spot. Sample can be prepared in a binding buffer that contains a lower ionic strength than the pretreating buffer. For example, start with a binding buffer of 20 mM ammonium acetate pH 6.5 containing 0.01% OGP or Triton X-100.
6. Note: It is preferred that salts are avoided in the binding buffer. It is also preferred to include a low concentration of non-ionic detergent (e.g., 0.01% OGP or Triton X-100) in the binding and washing buffers to reduce non-specific binding.
7. Varying the pH and ionic strength of the binding and/or washing buffer can modify ionic binding.
8. Place the probe in the plastic shipping tube, push a plug of wet tissue against the probe to keep it upright and close the cap to create a moist chamber.
9. Incubate the probe in the tube on a high-frequency shaker for 20 to 30 minutes. Secure tube on the shaker with adhesive tape. (Note: Incubating the probe on a high-frequency shaker can improve binding efficiency. However, if a shaker is not available, the probe can also be incubated in a moist chamber for 30 minutes to 1 hour.)

10. Wash each spot with 5 μL of a binding buffer five times, followed by a quick wash with water (5 μL two times).
11. Wipe dry around spots. Add 0.5 μL of saturated EAM solution to each spot when it is still moist. Air dry. Apply a second aliquot of 0.5 μL EAM (e.g., sinapinic acid matrix—saturated in 50% aqueous acetonitrile, 0.5% TFA) solution to each spot. Air dry.
12. Analyze the probe using a mass spectrometer (e.g., SELDI™ Protein Biology System). (Note: If the EAM peak interferes with the sample peaks in the low-mass region then one addition of EAM can be tried first. In addition, the intensity of the instrument can also be decreased to reduce the EAM signal.)

Recommended buffers for the above protocols are 20 to 100 mM ammonium acetate and phosphate buffers containing low concentration (e.g., 0.01%) of a non-ionic detergent (e.g., 0.1% Triton X-100).

C. Protocols for Using IMAC-3 ProteinChip™

The IMAC-3 probe contains nitrilotriacetic acid (NTA) groups on the surface. It is manufactured in the metal-free form and is loaded with Ni metal prior to use. The following protocol is exemplary, and any suitable modifications will be readily apparent to those skilled in the art.

1. Draw an outline for each spot using hydrophobic pen (e.g., ImmEdge™Pen, Vector Laboratories, Burlingame, Calif.).
2. Load 10 μL of 100 mM nickel sulfate to each spot and incubate on a high-frequency shaker (e.g., TOMMY MT-360 Microtube Mixer, Tomy Tech USA, Palo Alto, Calif.) at room temperature for 15 minutes. It is preferred that the solution is not allowed to air dry.
3. Rinse the probe under running deionized water for about 10 seconds to remove excess nickel.
4. Add 5 μL of 0.5M NaCl in PBS (or other binding buffer containing at least 0.5M NaCl) to each spot and incubate on shaker for 5 minutes. It is preferred that the buffer is not allowed to air dry. Wipe dry around the spots, and it is preferred that the spots are not allowed to dry.
5. Load 2–3 μL of sample per spot. Complex biological samples can be solubilized in 8M urea, 1% CHAPS in PBS pH 7.2, vortexed for 15 minutes at room temperature and further diluted in 0.5M NaCl/PBS to a final concentration of about 1M urea.
6. Place the probe in a plastic shipping tube, push a plug of water tissue against the probe to keep it upright and close a cap to create a moist chamber.
7. Incubate the probe in the tube on a high-frequency shaker for 20 to 30 minutes. The tube can be secured on the shaker using tape. (Note: Incubating probes on a high-frequency shaker can improve binding efficiency. However, if a shaker is not available, the probe can also be incubated in a moist chamber for 30 minutes to 1 hour.)
8. Wash each spot with 5 μL of binding buffer five times, followed by a quick wash with water (5 μL two times).
9. Wipe dry around the spots. Add 0.5 μL of saturated EAM solution to each spot when it is still moist. Air dry. Apply a second aliquot of EAM to each spot and air dry.
10. Analyze the probe using a mass spectrometer (e.g., SELDI Protein Biology System). (Note: If the EAM peak interferes with the sample peaks in the low-mass region then one addition of EAM can be tried first. In addition, the intensity of the instrument can also be decreased to reduce the EAM signal.)

For the above protocol, a binding buffer containing sodium chloride (at least 0.5M) and detergent (e.g. 0.1% Triton X-100) is recommended to minimize non-specific ionic and hydrophobic interactions, respectively. Complex biological samples can be solubilized in urea and detergent.

III. Recognition Profiles

In the examples described below, the SELDI™ Protein Biology System was used to collect data at laser intensity 50, sensitivity 9 with ND filter. An average of 80 shots per spot was obtained (10 positions times 8 shots per position). Each spot was warmed up with 4 shots using the same laser intensity.

A. Selective Binding of Fetal Calf Serum Proteins to the SAX-2 ProteinChip™ at Different pH Values Fetal calf serum samples (dialized, GIBCO BRL, Life Technologies, Grand Island, N.Y.) were diluted by 1 to 30 ratio in the following binding buffers: a) 0.1M sodium acetate, 0.1% Triton X-100 pH 4.5; b) 0.1M Tris HCl, 0.1% Triton X-100 pH 6.5; and c) 50 mM Tris base, 0.1% Triton X-100 pH 9.5. The samples were loaded on the SAX-2 probe, and the probe was prepared according to the protocol described above.

Figure 2:
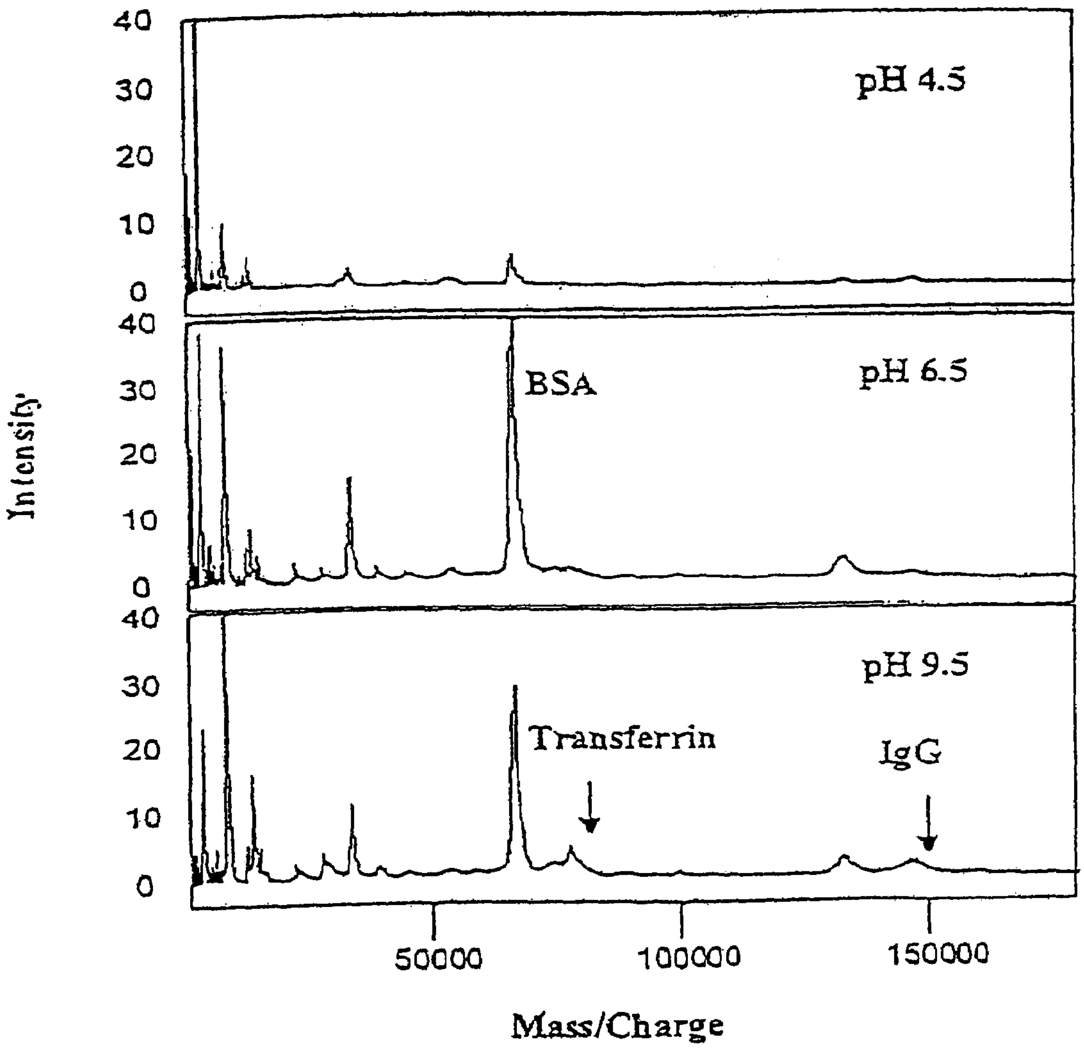
FIG. 2 shows resolution at high molecular mass of analytes in fetal calf serum bound on the probe surface comprising a cationic group.

FIG. 2 shows the composite mass spectrum at high molecular mass of the fetal calf serum proteins recognition profile. The bottom profile shows the signal intensity of bovine serum albumin (BSA), transferrin, and IgG retained on the SAX-2 probe when the sample was diluted and washed with the pH 9.5 buffer. The middle and the top profiles show that lowering pH of the buffer differentially enhances or decreases the retention of different components of the complex protein mixture on the same probe. For example, the middle profile shows the signal intensity of BSA which is enhanced when the sample was diluted and washed with the pH 6.5 buffer. By contrast, the signal intensities of transferrin and IgG were negligible when the sample was diluted with either the pH 6.5 buffer or the pH 4.5 buffer.

B. Selective Binding of Fetal Calf Serum Proteins to the WCX-1 ProteinChip™ at Different pH Values Fetal calf serum samples (dialized, GIBCO BRL, Life Technologies, Grand Island, N.Y.) were diluted by 1 to 30 ratio in the following binding buffers: a) 0.1M sodium acetate, 0.1% Triton X-100 pH 4.5; b) 0.1M sodium acetate, 0.1% Triton X-100 pH 5.5 and c) 0.1M sodium phosphate, 0.1% Triton X-100 pH 8.5. The samples were loaded on the WCX-1 probe, and the probe was prepared according to the protocol described above.

Figure 3:
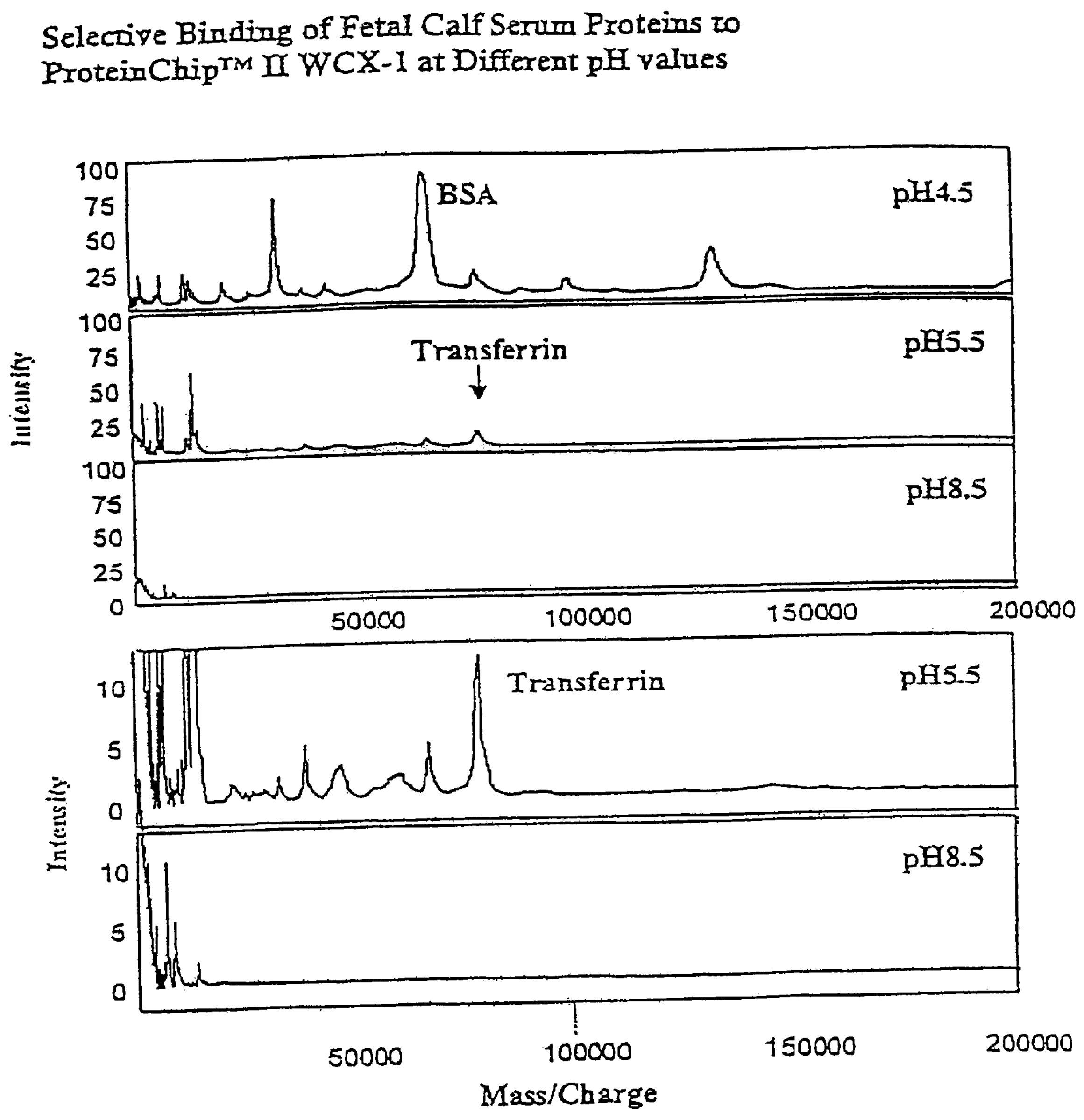
FIG. 3 shows resolution at high molecular mass of analytes in fetal calf serum bound on the probe surface comprising an anionic group.

FIG. 3 shows the composite mass spectrum at high molecular mass of the fetal calf serum proteins recognition profile. The top profile shows the serum proteins retained on the WCX-1 probe after the sample was diluted and washed with the pH 4.5 buffer. For example, the top profile illustrates a strong signal intensity of BSA and a weak signal intensity of transferrin. When the sample was diluted and washed with the pH 5.5 or pH 8.5 buffers, signals of many components of the serum proteins (including BSA and transferrin) decreased or were negligible.

C. Selective Binding of Fetal Calf Serum Proteins to the IMAC-3 ProteinChip™ at Different pH Values Fetal calf serum sampled (dialized, GIBCO BRL, Life Technologies, Grand Island, N.Y.) were diluted by 1 to 10 ratio in 8M urea, 1% CHAPS, PBS pH 7.2 and vortexed for 15 minutes at room temperature. Then the samples were further diluted by 1 to 3 in 0.5M NaCl/PBS. About 2–3 μL of diluted fetal calf serum was added to each spot of the IMAC-3 probe which was prepared as described above. After incubation in moist chamber for 20–30 minutes, six spots were washed with 0.5M NaCl/PBS, 0.1% Triton X-100, 5 μL each for five times, and another six spots were washed with 0.5M NaCl/PBS, 0.1% Triton X-100, 100 mM imidazole, 5 μL each for 5 times. The samples were washed and further prepared using the protocol described above.

Figure 4:
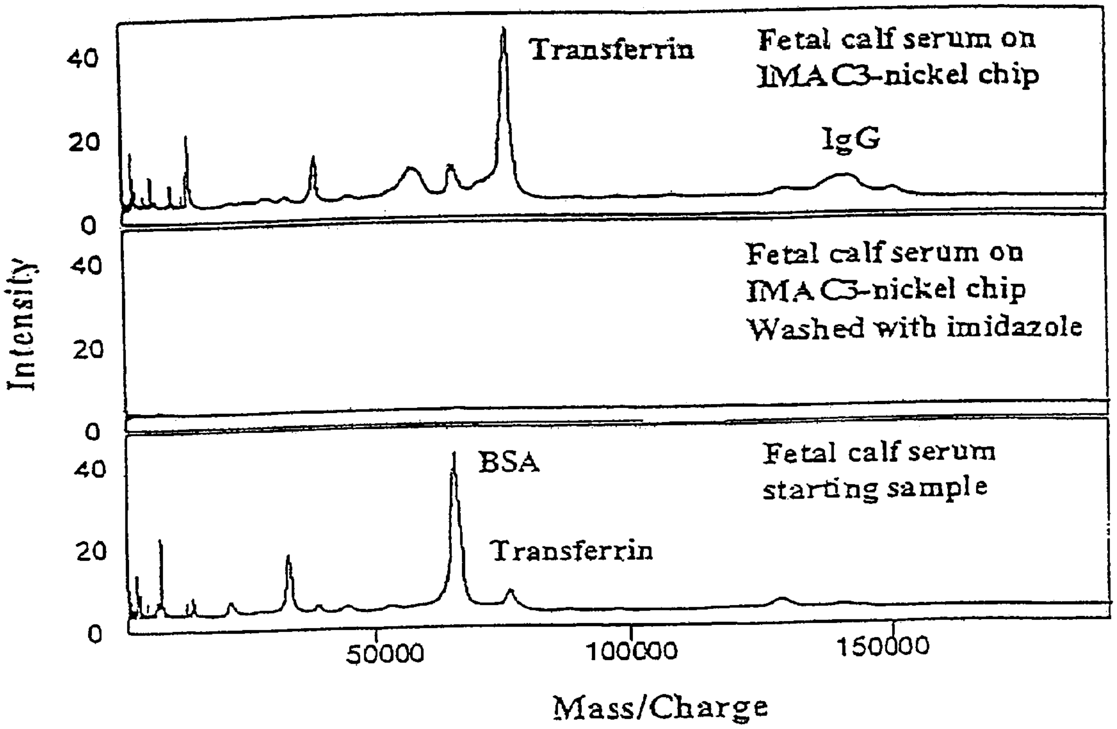
FIG. 4 shows resolution at high molecular mass of analytes in fetal calf serum bound on the probe surface comprising a metal chelating group.

FIG. 4 shows the composite mass spectrum at high molecular mass of the fetal calf serum proteins recognition profile. The bottom profile shows the serum proteins, in particular BSA and transferrin retained on a normal phase (e.g., a probe surface comprised of silicon oxide) after a wash with water. The top profile shows the serum proteins (e.g., transferring and IgG) retained on the IMAC3-nickel probe after the sample was diluted and washed with the buffer. As shown in the top profile, the IMAC3-nickel probe selectively retained transferrin, but binding of BSA was reduced compared to the normal phase. The middle profile shows that including imidazole (i.e., a histidine-binding competitive affinity ligand) decreased the retention of all the components of the complex protein mixture on the same probe.

The present invention provides novel materials and methods for detecting analytes using a gas phase ion spectrometer. While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined not with reference to the above description, but instead should be determined with reference to the appended claims along with their full scope of equivalents.

All publications and patent documents cited in this application are incorporated by reference in their entirety for all purposes to the same extent as if each individual publication or patent document were so individually denoted. By their citation of various references in this document Applicants do not admit any particular reference is "prior art" to their invention.

What is claimed is:

1. A method for detecting an analyte comprising:

(a) providing a probe comprising a substrate having a surface and a hydrogel material on the surface, wherein the hydrogel material comprises a water-insoluble and water-swellable polymer, having absorbed at least 10 times its own weight of a liquid, that is crosslinked and is at least about 10 microns thick and further comprises binding functionalities for binding with an analyte;

(b) exposing the binding functionalities of the hydrogel material to a sample containing an analyte under conditions to allow binding between the analyte and the binding functionalities of the hydrogel material;

(c) striking the probe surface with energy from an ionization source, thereby desorbing and ionizing the analyte;

(d) detecting the desorbed and ionized analyte by mass spectrometry.

2. The method of claim 1 wherein the hydrogel material is derived from substituted acrylamide monomers, substituted acrylate monomers, or derivatives thereof.

3. The method of claim 1 wherein the hydrogel material comprises cellulose or dextran.

4. The method of claim 1 wherein the hydrogel material is derived from 3-(methacryloylamino)propyltrimethylammonium chloride monomers.

5. The method of claim 1 wherein the hydrogel material is derived from 2-acrylamidoglycolic acid monomers.

6. The method of claim 1 wherein the hydrogel material is derived from N-(acrylamidoethyl)ethylenediamine N, N', N'-triacetic acid monomers.

7. The method of claim 1 wherein the binding functionalities attract the analyte by salt-promoted interactions, hydrophilic interactions, eletrostatic interactions, coordinate interactions, covalent interactions, enzyme site interactions, reversible covalent interactions, nonreversible covalent interactions, glycoprotein interactions, biospecific interactions, or combinations thereof.

8. The method of claim 1 wherein the binding functionalities of the hydrogel material are selected from the group consisting of a carboxyl group, a sulfonate group, a phosphate group, an ammonium group, a hydrophilic group, a hydrophobic group, a reactive group, a metal chelating group, a thioether group, a biotin group, a boronate group, a dye group, a cholesterol group, and derivatives thereof.

9. The method of claim 1 wherein the binding functionalities comprise a carboxyl group and the hydrogel material is derived from monomers selected from the group consisting of (meth)acrylic acid, 2-carboxyethyl acrylate, N-acryloyl-aminohexanoic acid, N-carboxymethylacrylamide, 2-acrylamidoglycolic acid, and derivatives thereof.

10. The method of claim 1 wherein the binding functionalities comprise a sulfonate group and the hydrogel material is derived from acrylamidomethyl-propane sulfonic acid monomers or derivatives thereof.

11. The method of claim 1 wherein the binding functionalities comprise a phosphate group and the hydrogel material is derived from N-phosphoethyl acrylamide monomers or derivatives thereof.

12. The method of claim 1 wherein the binding functionalities comprise an ammonium group and the hydrogel material is derived from monomers selected from the group consisting of trimethylaminoethyl methacrylate, diethylaminoethyl methacrylate, diethylaminoethyl acrylamide, diethylaminoethyl methacrylamide, diethylaminopropyl methacrylamide, aminopropyl acrylamide, 3(methacryloylamino)propyltrimethylammonium chloride, 2-aminoethyl methacrylate, N-(3-aminopropyl)methacrylamide, 2-(t-butylamino)ethyl methacrylate, 2-(N, N-dimethylamino)ethyl (meth)acrylate, N-(2-(N, N-dimethylamino))ethyl (meth) acrylamide, N-(3-(N, N-dimethylamino))propyl methacrylamide, 2-(meth)acryloyloxyethyltrimethylammonium chloride, 3-methacryloyloxy-2-hydroxypropyltrimethylammonium chloride, (2-acryloyloxyethyl)(4-benzoylbenzyl)dimethylammonium bromide, 2-vinylpyridine, 4-vinylpyridine, vinylimidazole, and derivatives thereof.

13. The method of claim 1 wherein the binding functionalities comprise a hydrophilic group and the hydrogel material is derived from monomers selected from the group consisting of N-(meth)acryloyltris(hydroxymethyl)methylamine, hydroxyethyl acrylamide, hydroxypropyl methacrylamide, N-acrylamido-1-deoxysorbitol, hydroxyethyl(meth) acrylate, hydroxypropylacrylate, hydroxyphenylmethacrylate, polyethylene glycol monomethacrylate, polyethylene glycol dimethacrylate, acrylamide, glycerol mono(meth)acrylate, 2-hydroxypropyl acrylate, 4-hydroxybutyl methacrylate, 2-methacryloxyethyl glucoside, poly(ethyleneglycol) monomethyl ether monomethacrylate, vinyl 4-hydroxybutyl ether, and derivatives thereof.

14. The method of claim 1 wherein the binding functionalities comprise a hydrophobic group and the hydrogel material is derived from monomers selected from the group consisting of N, N-dimethyl acrylamide, N, N-diethyl (meth)acrylamide, N-methyl methacrylamide, N-ethyl methacrylamide, N-propyl acrylamide, N-butyl acrylamide, N-octyl (meth)acrylamide, N-dodecyl methacrylamide, N-octadecyl acrylamide, propyl (meth)acrylate, decyl (meth)acrylate, stearyl (meth)acrylate, octyl-triphenylmethylacrylamide, butyl-triphenylmethylacrylamide, octadecyl-triphenylmethylacrylamide, phenyl-triphenylmethylacrylamide, benzyl-triphenylmethylacrylamide, and derivatives thereof.

15. The method of claim 1 wherein the binding functionalities comprise a metal chelating group and the hydrogel material is derived from monomers selected from the group consisting of N-(3-N, N-biscarboxymethylamino)propyl methacrylamide, 5-methacrylamido-2-(N, N-biscarboxymethylamino)pentanoic acid, N-(acrylamidoethyl)ethylenediamine N, N', N'-triacetic acid, and derivatives thereof.

16. The method of claim 1 wherein the binding functionalities comprise a reactive group and the hydrogel material is derived from monomers selected from the group consisting of glycidyl acrylate, acryloyl chloride, glycidyl(meth) acrylate, (meth)acryloyl chloride, N-acryloxysuccinimide, vinyl azlactone, acrylamidopropyl pyridyl disulfide, N-(acrylamidopropyl)maleimide, acrylamidodeoxy sorbitol activated with bis-epoxirane compounds, allylchloroformate, (meth)acrylic anhydride, acrolein, allylsuccinic anhydride, citraconic anhydride, allyl glycidyl ether, and derivatives thereof.

17. The method of claim 1 wherein the binding functionalities comprise a thioether group and the hydrogel material is derived from thiophilic monomers selected from the group consisting of 2-hydroxy-3-mercaptopyridylpropyl (methacrylate), 2-(2-(3-(meth)acryloxyethoxy)ethanesulfonyl) ethylsulfanyl ethanol, and derivatives thereof.

18. The method of claim 1 wherein the binding functionalities comprise a biotin group and the hydrogel material is derived from biotin monomers selected from the group consisting of N-biotinyl-3-(meth)acrylamidopropylamine and derivatives thereof.

19. The method of claim 1 wherein the binding functionalities comprise a boronate group and the hydrogel material is derived from boronate monomers selected from the group consisting of N-(m-dihydroxyboryl)phenyl (meth)acrylamide and derivatives thereof.

20. The method of claim 1 wherein the binding functionalities comprise a dye group and the hydrogel material is derived from dye monomers selected from the group consisting of N-(N'-dye coupled aminopropyl) (meth)acrylamide and derivatives thereof.

21. The method of claim 1 wherein the binding functionalities comprise a cholesterol group and the hydrogel material is derived from cholesterol monomers selected from the group consisting of N-cholesteryl-3-(meth)acrylamidopropylamine and derivatives thereof.

22. The method of claim 1 wherein the surface of the substrate is conditioned with a silane-based coupling agent and the hydrogel material adheres to the surface through a covalent interaction with the coupling agent.

23. The method of claim 1 further comprising, after step (b), washing the hydrogel to remove unbound material.

24. The method of claim 1 wherein the analyte comprises a polypeptide.

25. The method of claim 1 wherein the analyte is selected from the group consisting of polynucleotides, avidin, streptavidin, polysaccharides, lectins, proteins, pepstatin, protein A, agglutinin, heparin, protein G, and concanavalin.

26. The method of claim 1 wherein the sample is selected from a cell lysate or homogenate, a tissue lysate or homogenate, an organ lysate or homogenate, blood, urine and cerebrospinal fluid.

27. The method of claim 1 wherein mass spectrometry is time-of-flight mass spectrometry.

28. The method of claim 1 wherein the substrate comprises a metal having a thickness of at least 0.5 mm, wherein the substrate is coated with silicon oxide.

29. The method of claim 1 wherein the ionization source is a laser.

30. The method of claim 29 further comprising, after step (b), applying a matrix material to the hydrogel material.

31. The method of any of claims 1–30 wherein the substrate comprises a metal having a thickness of at least 0.5 mm.

* * * * *